United States Patent
Lynn et al.

(10) Patent No.: US 7,526,808 B2
(45) Date of Patent: *Apr. 28, 2009

(54) METHOD AND SYSTEM FOR ACTIVELY DEFENDING A WIRELESS LAN AGAINST ATTACKS

(75) Inventors: Michael T. Lynn, Roswell, GA (US); Scott Hrastar, Duluth, GA (US)

(73) Assignee: AirDefense, Inc., Alpharetta, GA (US)

(*) Notice: Subject to any disclaimer, the term of this patent is extended or adjusted under 35 U.S.C. 154(b) by 457 days.

This patent is subject to a terminal disclaimer.

(21) Appl. No.: 11/370,611

(22) Filed: Mar. 8, 2006

(65) Prior Publication Data

US 2007/0192870 A1 Aug. 16, 2007

Related U.S. Application Data

(63) Continuation of application No. 10/161,443, filed on Jun. 3, 2002, now Pat. No. 7,058,796.

(60) Provisional application No. 60/381,829, filed on May 20, 2002.

(51) Int. Cl.
*G06F 15/18* (2006.01)
*G06F 17/00* (2006.01)
*H04L 9/00* (2006.01)
*H04K 1/00* (2006.01)

(52) U.S. Cl. .................. 726/23; 726/12; 726/13; 726/14; 713/150; 713/151; 713/161; 713/168; 380/255; 380/270

(58) Field of Classification Search ............ 726/23
See application file for complete search history.

(56) References Cited

U.S. PATENT DOCUMENTS 5,077,753 A 12/1991 Grau, Jr. et al.

(Continued)

FOREIGN PATENT DOCUMENTS

WO   WO 98/59428   12/1998

(Continued)

OTHER PUBLICATIONS

Namboodiri et al, Alert: An Adaptive Low-Latency Event-Driven MAC Protocol Wireless Sensor Networks, 2008, IEEE, pp. 159-170.*

(Continued)

*Primary Examiner*—Christopher A Revak
*Assistant Examiner*—Aravind K Moorthy
(74) *Attorney, Agent, or Firm*—Clements Bernard PLLC; Lawrence A. Baratta, Jr.

(57) ABSTRACT

A wireless network security system including a system data store capable of storing network default and configuration data, a wireless transmitter and a system processor. The system processor performs a network security method. An active defense request signal is received, typically from an intrusion detection system. The received request signal includes an indicator of an access point within the wireless computer network that is potentially compromised. In response to the received an active defense of the wireless network is triggered. The triggered active defense may be on or more of transmitting a jamming signal, transmitting a signal to introduce CRC errors, transmitting a signal to increase the difficulty associated with breaking the network encryption (typically by including in the signal packet appearing legitimate but containing randomized payloads, or transmitting a channel change request to the potentially compromised access point.

26 Claims, 10 Drawing Sheets

U.S. PATENT DOCUMENTS

| | | | |
|---|---|---|---|
| 5,231,634 A | 7/1993 | Giles et al. | |
| 5,237,614 A | 8/1993 | Weiss | |
| 5,339,316 A | 8/1994 | Diepstraten | |
| 5,393,965 A | 2/1995 | Bravman et al. | |
| 5,487,069 A | 1/1996 | O'Sullivan et al. | |
| 5,577,209 A | 11/1996 | Boyle et al. | |
| 5,646,389 A | 7/1997 | Bravman et al. | |
| 5,666,662 A | 9/1997 | Shibuya | |
| 5,737,328 A | 4/1998 | Norman et al. | |
| 5,745,479 A | 4/1998 | Burns et al. | |
| 5,745,483 A | 4/1998 | Nakagawa et al. | |
| 5,768,312 A | 6/1998 | Imamura | |
| 5,781,857 A | 7/1998 | Hwang et al. | |
| 5,787,077 A | 7/1998 | Kuehnel et al. | |
| 5,796,942 A | 8/1998 | Esbensen | |
| 5,809,060 A | 9/1998 | Cafarella et al. | |
| 5,825,817 A | 10/1998 | Tamaka et al. | |
| 5,844,900 A | 12/1998 | Hong et al. | |
| 5,866,888 A | 2/1999 | Bravman et al. | |
| 5,870,666 A | 2/1999 | Tanaka et al. | |
| 5,875,179 A | 2/1999 | Tikalsky | |
| 5,896,499 A | 4/1999 | McKelvey | |
| 5,903,848 A | 5/1999 | Takahashi | |
| 5,913,174 A | 6/1999 | Casarez et al. | |
| 5,919,258 A | 7/1999 | Kayashima et al. | |
| 5,940,591 A | 8/1999 | Boyle et al. | |
| 5,953,652 A | 9/1999 | Amin et al. | |
| 5,987,609 A | 11/1999 | Hasebe | |
| 6,006,090 A | 12/1999 | Coleman et al. | |
| 6,058,482 A | 5/2000 | Liu | |
| 6,067,297 A | 5/2000 | Beach | |
| 6,070,244 A | 5/2000 | Orchier et al. | |
| 6,104,712 A | 8/2000 | Robert et al. | |
| 6,119,230 A | 9/2000 | Carter | |
| 6,141,778 A | 10/2000 | Kane et al. | |
| 6,145,083 A | 11/2000 | Shaffer et al. | |
| 6,151,357 A | 11/2000 | Jawahar et al. | |
| 6,158,010 A | 12/2000 | Moriconi et al. | |
| 6,178,512 B1 | 1/2001 | Fifield | |
| 6,185,689 B1 | 2/2001 | Todd, Sr. et al. | |
| 6,188,681 B1 | 2/2001 | Vesuna | |
| 6,202,157 B1 | 3/2001 | Brownlie et al. | |
| 6,208,247 B1 * | 3/2001 | Agre et al. | 340/539.19 |
| 6,272,129 B1 | 8/2001 | Dynarski et al. | |
| 6,272,172 B1 | 8/2001 | Deshpande et al. | |
| 6,282,546 B1 | 8/2001 | Gleichauf et al. | |
| 6,289,214 B1 | 9/2001 | Backstrom | |
| 6,292,508 B1 | 9/2001 | Hong et al. | |
| 6,301,668 B1 | 10/2001 | Gleichauf et al. | |
| 6,301,699 B1 | 10/2001 | Hollander et al. | |
| 6,304,973 B1 | 10/2001 | Williams | |
| 6,317,829 B1 | 11/2001 | Van Oorschot | |
| 6,320,948 B1 | 11/2001 | Heilmann et al. | |
| 6,324,647 B1 | 11/2001 | Bowman-Amuah | |
| 6,324,656 B1 | 11/2001 | Gleichauf et al. | |
| 6,330,244 B1 | 12/2001 | Swartz et al. | |
| 6,363,477 B1 | 3/2002 | Fletcher et al. | |
| 6,400,752 B1 | 6/2002 | Suzuki et al. | |
| 6,404,772 B1 | 6/2002 | Beach et al. | |
| 6,411,608 B2 | 6/2002 | Sharony | |
| 6,453,159 B1 | 9/2002 | Lewis | |
| 6,453,345 B2 | 9/2002 | Trcka et al. | |
| 6,466,608 B1 | 10/2002 | Hong et al. | |
| 6,470,384 B1 | 10/2002 | O'Brien et al. | |
| 6,473,449 B1 | 10/2002 | Cafarella et al. | |
| 6,477,198 B1 | 11/2002 | Gumm | |
| 6,484,029 B2 | 11/2002 | Hughes et al. | |
| 6,487,666 B1 | 11/2002 | Shanklin et al. | |
| 6,499,107 B1 | 12/2002 | Gleichauf et al. | |
| 6,501,951 B2 | 12/2002 | Moore | |
| 6,507,864 B1 | 1/2003 | Klein et al. | |
| 6,522,689 B1 | 2/2003 | Heinrich | |
| 6,539,207 B1 | 3/2003 | del Castillo et al. | |
| 6,539,428 B2 | 3/2003 | Davies | |
| 6,674,403 B2 | 1/2004 | Gray et al. | |
| 6,697,337 B1 | 2/2004 | Cafarelli et al. | |
| 6,799,047 B1 | 9/2004 | Bahl et al. | |
| 6,874,089 B2 | 3/2005 | Dick et al. | |
| 6,910,135 B1 | 6/2005 | Grainger | |
| 6,934,298 B2 | 8/2005 | Bentley | |
| 7,068,998 B2 * | 6/2006 | Zavidniak | 455/410 |
| 7,302,704 B1 * | 11/2007 | Elliott | 726/22 |
| 2001/0027107 A1 | 10/2001 | Shinozaki et al. | |
| 2001/0030956 A1 | 10/2001 | Chillariga et al. | |
| 2001/0038626 A1 | 11/2001 | Dynarski et al. | |
| 2001/0039579 A1 | 11/2001 | Trcka et al. | |
| 2002/0021745 A1 | 2/2002 | Negus | |
| 2002/0029288 A1 | 3/2002 | Dobbins et al. | |
| 2002/0032871 A1 | 3/2002 | Malan et al. | |
| 2002/0035699 A1 | 3/2002 | Crosbie | |
| 2002/0044533 A1 | 4/2002 | Bahl et al. | |
| 2002/0059434 A1 | 5/2002 | Karaoguz et al. | |
| 2002/0060994 A1 | 5/2002 | Kovacs et al. | |
| 2002/0060995 A1 | 5/2002 | Cervello et al. | |
| 2002/0061031 A1 | 5/2002 | Sugar et al. | |
| 2002/0066034 A1 | 5/2002 | Schlossberg et al. | |
| 2002/0072329 A1 | 6/2002 | Bandeira et al. | |
| 2002/0083343 A1 | 6/2002 | Crosbie et al. | |
| 2002/0087882 A1 | 7/2002 | Schneier et al. | |
| 2002/0090089 A1 | 7/2002 | Branigan et al. | |
| 2002/0090952 A1 | 7/2002 | Cantwell | |
| 2002/0094777 A1 | 7/2002 | Cannon et al. | |
| 2002/0101837 A1 | 8/2002 | Bender et al. | |
| 2002/0112047 A1 | 8/2002 | Kushwaha et al. | |
| 2002/0112185 A1 | 8/2002 | Hodges | |
| 2002/0129138 A1 | 9/2002 | Carter | |
| 2002/0138755 A1 | 9/2002 | Ko | |
| 2002/0147920 A1 | 10/2002 | Mauro | |
| 2002/0160769 A1 | 10/2002 | Gray | |
| 2002/0161755 A1 | 10/2002 | Moriarty | |
| 2002/0174364 A1 | 11/2002 | Nordman et al. | |
| 2002/0176437 A1 | 11/2002 | Busch et al. | |
| 2002/0178383 A1 | 11/2002 | Hrabik et al. | |
| 2002/0181417 A1 | 12/2002 | Malhotra et al. | |
| 2003/0009696 A1 | 1/2003 | Bunker V. et al. | |
| 2003/0021254 A1 | 1/2003 | Fukuda | |
| 2003/0026198 A1 | 2/2003 | Diepstraten et al. | |
| 2003/0027550 A1 | 2/2003 | Rockwell | |
| 2003/0036404 A1 | 2/2003 | Adachi et al. | |
| 2003/0048770 A1 | 3/2003 | Proctor, Jr. | |
| 2003/0060207 A1 | 3/2003 | Sugaya et al. | |
| 2003/0061344 A1 | 3/2003 | Monroe | |
| 2003/0061506 A1 | 3/2003 | Cooper et al. | |
| 2003/0063592 A1 | 4/2003 | Seki et al. | |
| 2003/0064720 A1 | 4/2003 | Valins et al. | |
| 2003/0065934 A1 | 4/2003 | Angelo et al. | |
| 2003/0070084 A1 | 4/2003 | Satomaa et al. | |
| 2003/0084321 A1 * | 5/2003 | Tarquini et al. | 713/200 |
| 2003/0084323 A1 | 5/2003 | Gales | |
| 2003/0088789 A1 | 5/2003 | Fenton et al. | |
| 2003/0095520 A1 | 5/2003 | Aalbers et al. | |
| 2003/0096577 A1 | 5/2003 | Heinonen et al. | |
| 2003/0096607 A1 | 5/2003 | Taylor | |
| 2003/0100308 A1 | 5/2003 | Rusch | |
| 2003/0105976 A1 | 6/2003 | Copeland, III | |
| 2003/0108016 A1 | 6/2003 | Bonta | |
| 2003/0110398 A1 | 6/2003 | Dacier et al. | |
| 2003/0117966 A1 | 6/2003 | Chen | |
| 2003/0117985 A1 | 6/2003 | Fujii et al. | |
| 2003/0117986 A1 | 6/2003 | Thermond et al. | |
| 2003/0119526 A1 | 6/2003 | Edge | |
| 2003/0120821 A1 | 6/2003 | Thermond et al. | |
| 2003/0123420 A1 | 7/2003 | Sherlock | |
| 2003/0125035 A1 | 7/2003 | Khafizov et al. | |

| | | |
|---|---|---|
| 2003/0126258 A1 | 7/2003 | Conkright et al. |
| 2003/0135762 A1 | 7/2003 | Macaulay |
| 2003/0140246 A1 | 7/2003 | Kammer et al. |
| 2003/0149888 A1 | 8/2003 | Yadav |
| 2003/0161341 A1 | 8/2003 | Wu et al. |
| 2003/0174680 A1 | 9/2003 | Kuan et al. |
| 2003/0185244 A1 | 10/2003 | Wu et al. |
| 2003/0189908 A1 | 10/2003 | Kuan et al. |
| 2003/0192055 A1 | 10/2003 | Aoki et al. |
| 2003/0196115 A1 | 10/2003 | Karp |
| 2003/0200455 A1 | 10/2003 | Wu |
| 2003/0217289 A1 | 11/2003 | Ammon et al. |
| 2003/0221006 A1 | 11/2003 | Kuan et al. |
| 2003/0224797 A1 | 12/2003 | Kuan et al. |
| 2004/0003285 A1 | 1/2004 | Whelan et al. |
| 2004/0068668 A1 | 4/2004 | Lor et al. |
| 2004/0078598 A1 | 4/2004 | Barber et al. |
| 2004/0102192 A1 | 5/2004 | Serceki |
| 2004/0103307 A1 | 5/2004 | Raphaeli et al. |
| 2004/0107219 A1 | 6/2004 | Rosenberger |
| 2004/0136318 A1 | 7/2004 | Bentley |
| 2004/0162995 A1 | 8/2004 | Muaddi et al. |
| 2008/0271151 A1* | 10/2008 | Blake et al. .................. 726/25 |
| 2008/0307487 A1* | 12/2008 | Choyi et al. .................. 726/1 |
| 2008/0313737 A1* | 12/2008 | Garg et al. .................. 726/23 |

FOREIGN PATENT DOCUMENTS

| | | |
|---|---|---|
| WO | WO 01/43467 A1 | 6/2001 |
| WO | WO 02/058346 A2 | 7/2002 |
| WO | WO 02/058346 A3 | 7/2002 |
| WO | WO 02/097560 A2 | 12/2002 |
| WO | WO 03/021851 | 3/2003 |
| WO | WO 03/079708 A1 | 9/2003 |
| WO | WO 03/084255 A1 | 10/2003 |
| WO | WO 03/085544 A1 | 10/2003 |
| WO | WO 03/088547 A2 | 10/2003 |
| WO | WO 03/088687 | 10/2003 |

OTHER PUBLICATIONS

Nakamura et al, Information Fusion for Wireless Sensor Networks: Methods, Models, and Classifications, 2007, ACM, pp. 1-55.*
Li et al, A Distributed Intrusion Detection Scheme for Wireless Sensor Networks, 2008, IEEE, pp. 309-314.*
Li et al, A Group-Based Intrusion Detection Scheme in Wireless Sensor Networks, 2008, IEEE, pp. 286-291.*
*Distributed Wireless Security Auditor*, IBM Research http://www.research.ibm.com/gsal/dwsa/ (Accessed: Apr. 10, 2003).
*IBM Debuts First Self-Diagnostic Wireless Security Tool on Linux*, Lwn.Net, (Date Alleged: Jun. 17, 2002) http://www.lwn.net/Articles/2661 (Accessed: Apr. 10, 2003).
*IBM extends its Wireless Security Auditor with more autonomic features*, Serverworld Online News (Date Alleged: Jun. 2002) http://www.serverworldmagazine.com/newsflash2/2002/06/19_ibmdwsa.shtml (Accessed: Apr. 10, 2003).
*IBM initiative addresses wireless security*, M2 Preswire (Date alleged: Oct. 9, 2001) http://www.lexis.com/research (Accessed: Apr. 10, 2003).
*IBM Research's Wireless Security Auditor One-Step Ahead of Hackers*, Mobileinfo.Com , Issue 2001—30 (Date Alleged: Jul. 2001) (Alleged Update: Jul. 25, 2001) http://www.mobileinfo.com/News_2001/Issue30/IBM_Auditor.htm (Accessed from Google's cache: Apr. 10, 2003).
*IBM unlocks wireless security services*, It World.Com (Date Alleged: Oct. 9, 2001) http://www.itworld.com/Net/2629/IDGO11009IBMsecurity (Accessed from Google's cache: Apr. 10, 2003.
Losi, Stephanie, *IBM Steps Up Wireless Security*, Newsfactor Network (Date Alleged: Oct. 8, 2001) http://www.newsfactor.com/perl/story/14012.html (Accessed: Apr. 10, 2003).
Lough, Daniel et al., "A Short Tutorial on Wireless LANs and IEEE 802.11" printed on May 27, 2002 in *The IEEE Computer Society's Student Newsletter*, Summer 1997, vol. 5, No. 2.
Manecksha, Ferina, *IBM to focus on "Think" strategy*, News Straits Times-Management Times (Date Alleged: Jan. 30, 2003) http://www.lexis.com/research (Accessed: Apr. 10, 2003).
Morochove, Richard, *Why Dell lets competitors do the heavy lifting*, Toronto Star (Date Alleged: Nov. 11, 2002) http://www.lexis.com/research (Accessed: Apr. 10, 2003).
Schwartz, Ephraim, *IBM Offers a Peek at Self-Healing PCS: Autonomic computing initiative will lead to self-configuring desktops and notebooks and greater wireless security*. (Date Alleged: Nov. 19, 2002) http://www.pcworld.com/resource/printable/article/0,aid,107069.asp (Accessed from Google's cache: Apr. 10, 2003).
Schwartz, Ephraim, *IBM unveils autonomic computing on notebooks, desktops*, Inforworld Daily News (Date Alleged: Nov. 19, 2002) http://www.lexis.com/research (Accessed: Apr. 10, 2003).
Toomgum, Sirvish, *"Think" Big Blue*, Nation, Worldsources, Inc. (Date Alleged: Nov. 19, 2002) http://www.lexis.com/research (Accessed: Apr. 10, 2003).
*WhereLAN Location Sensor Locating Access Point*, Wherenet U.S.A. (2002).
*Wireless Security Auditor (WSA)*, IBM Security Research http://www.research.ibm.com/gsal/wsa/ (Accessed: Apr. 10, 2003).

* cited by examiner

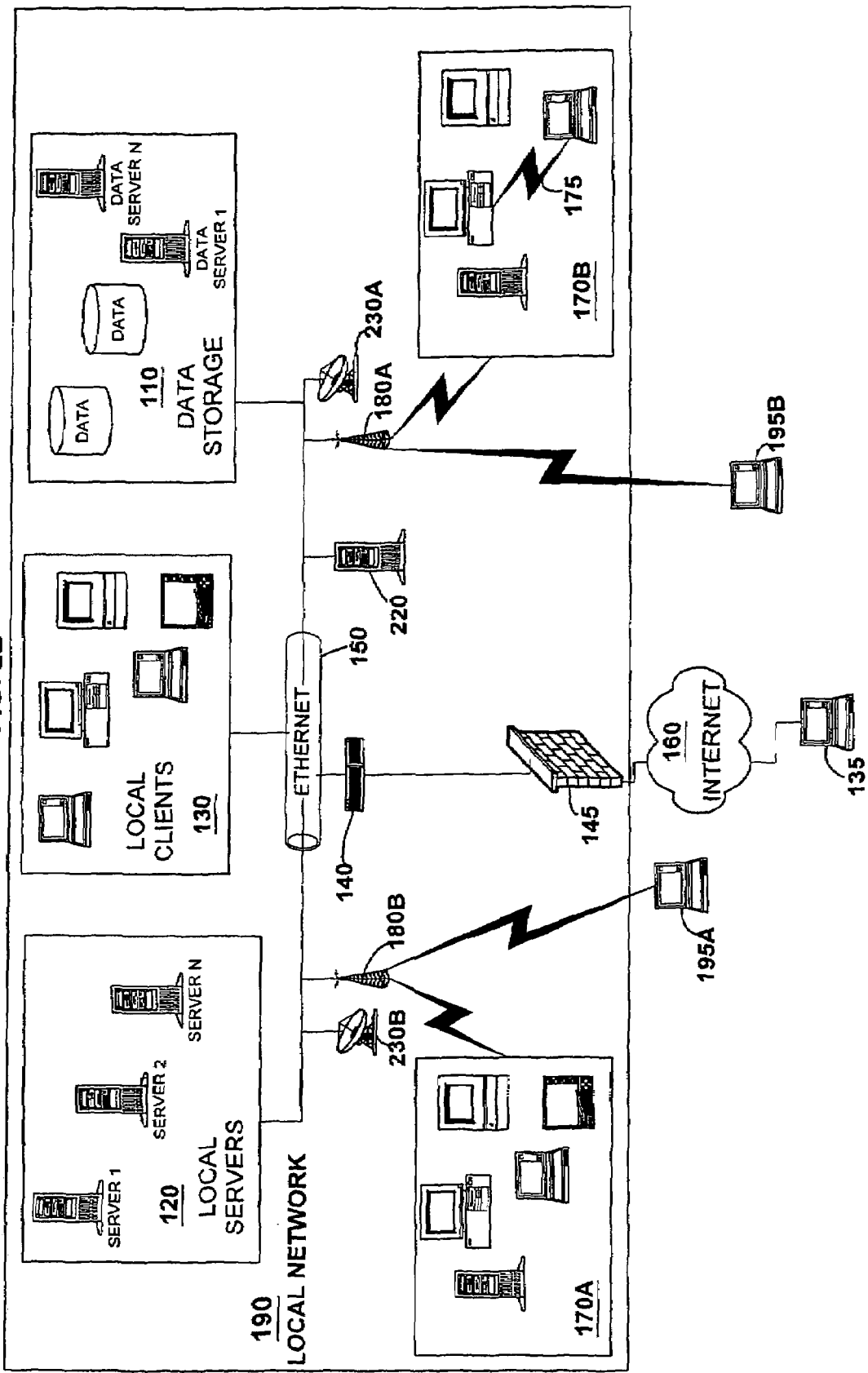

METHOD AND SYSTEM FOR ACTIVELY DEFENDING A WIRELESS LAN AGAINST ATTACKS

CROSS-REFERENCE TO RELATED PATENT APPLICATIONS

This application is a continuation of U.S. patent application Ser. No. 10/161,443 filed Jun. 3, 2002 now U.S. Pat. No. 7,058,796, which claims the benefit, pursuant to 35 U.S.C. §119(e), of applicants' provisional U.S. patent application Ser. No. 60/381,829, filed May 20, 2002, entitled "SYSTEMS AND METHODS FOR NETWORK SECURITY", which application is hereby incorporated by this reference in its entirety for all purposes.

This application is related to the following U.S. patent applications filed Jun. 3, 2002, each of which is hereby incorporated by this reference in its entirety for all purposes:

| Inventors | Title | Serial Number |
|---|---|---|
| Hrastar, Lynn, Sale, Hollingsworth | "SYSTEMS AND METHODS FOR NETWORK SECURITY" | TBA |
| Hrastar | "SYSTEM AND METHOD FOR WIRELESS LAN DYNAMIC CHANNEL CHANGE WITH HONEYPOT TRAP" | TBA |
| Hrastar, Lynn | "METHODS AND SYSTEMS FOR IDENTIFYING NODES AND MAPPING THEIR LOCATIONS" | TBA |
| Hrastar | "METHOD AND SYSTEM FOR ENCRYPTED NETWORK MANAGEMENT AND INTRUSION DETECTION" | TBA |

BACKGROUND

The present invention is directed to systems and methods for enhancing security associated with electronic communications. More specifically, without limitation, the present invention relates to computer-based systems and methods for assessing security risks and identifying and responding to threats in wireless network environments.

The Internet is a global network of connected computer networks. Over the last several years, the Internet has grown in significant measure. A large number of computers on the Internet provide information in various forms. Anyone with a computer connected to the Internet can potentially tap into this vast pool of information.

The information available via the Internet encompasses information available via a variety of types of application layer information servers such as SMTP (simple mail transfer protocol), POP3 (Post Office Protocol), GOPHER (RFC 1436), WAIS, HTTP (Hypertext Transfer Protocol, RFC 2616) and FTP (file transfer protocol, RFC 1123).

One of the most wide spread method of providing information over the Internet is via the World Wide Web (the Web). The Web consists of a subset of the computers connected to the Internet; the computers in this subset run Hypertext Transfer Protocol (HTTP) servers (Web servers). Several extensions and modifications to HTTP have been proposed including, for example, an extension framework (RFC 2774) and authentication (RFC 2617). Information on the Internet can be accessed through the use of a Uniform Resource Identifier (URI, RFC 2396). A URI uniquely specifies the location of a particular piece of information on the Internet. A URI will typically be composed of several components. The first component typically designates the protocol by which the address piece of information is accessed (e.g., HTTP, GOPHER, etc.). This first component is separated from the remainder of the URI by a colon (':'). The remainder of the URI will depend upon the protocol component. Typically, the remainder designates a computer on the Internet by name, or by IP number, as well as a more specific designation of the location of the resource on the designated computer. For instance, a typical URI for an HTTP resource might be:

www.server.com/dir1/dir2/resource.htm where http is the protocol, www.server.com is the designated computer and /dir1/dir2/resouce.htm designates the location of the resource on the designated computer. The term URI includes Uniform Resource Names (URN's) including URN's as defined according to RFC 2141.

Web servers host information in the form of Web pages; collectively the server and the information hosted are referred to as a Web site. A significant number of Web pages are encoded using the Hypertext Markup Language (HTML) although other encodings using eXtensible Markup Language (XML) or XHTML. The published specifications for these languages are incorporated by reference herein; such specifications are available from the World Wide Web Consortium and its Web site (www.w3c.org). Web pages in these formatting languages may include links to other Web pages on the same Web site or another. As will be known to those skilled in the art, Web pages may be generated dynamically by a server by integrating a variety of elements into a formatted page prior to transmission to a Web client. Web servers, and information servers of other types, await requests for the information from Internet clients.

Client software has evolved that allows users of computers connected to the Internet to access this information. Advanced clients such as Netscape's Navigator and Microsoft's Internet Explorer allow users to access software provided via a variety of information servers in a unified client environment. Typically, such client software is referred to as browser software.

Electronic mail (e-mail) is another wide spread application using the Internet. A variety of protocols are often used for e-mail transmission, delivery and processing including SMTP and POP3 as discussed above. These protocols refer, respectively, to standards for communicating e-mail messages between servers and for server-client communication related to e-mail messages. These protocols are defined respectively in particular RFC's (Request for Comments) promulgated by the IETF (Internet Engineering Task Force). The SMTP protocol is defined in RFC 821, and the POP3 protocol is defined in RFC 1939.

Since the inception of these standards, various needs have evolved in the field of e-mail leading to the development of further standards including enhancements or additional protocols. For instance, various enhancements have evolved to the SMTP standards leading to the evolution of extended SMTP. Examples of extensions may be seen in (1) RFC 1869 that defines a framework for extending the SMTP service by defining a means whereby a server SMTP can inform a client SMTP as to the service extensions it supports and in (2) RFC 1891 that defines an extension to the SMTP service, which allows an SMTP client to specify (a) that delivery status notifications (DSNs) should be generated under certain conditions, (b) whether such notifications should return the contents of the message, and (c) additional information, to be returned with a DSN, that allows the sender to identify both the recipient(s) for which the DSN was issued, and the transaction in which the original message was sent.

In addition, the IMAP protocol has evolved as an alternative to POP3 that supports more advanced interactions between e-mail servers and clients. This protocol is described in RFC 2060.

The various standards discussed herein by reference to particular RFC's are hereby incorporated by reference herein for all purposes. These RFC's are available to the public through the Internet Engineering Task Force (IETF) and can be retrieved from its Web site (www.ietf.org/rfc.html). The specified protocols are not intended to be limited to the specific RFC's quoted herein above but are intended to include extensions and revisions thereto. Such extensions and/or revisions may or may not be encompassed by current and/or future RFC's.

A host of e-mail server and client products have been developed in order to foster e-mail communication over the Internet. E-mail server software includes such products as sendmail-based servers, Microsoft Exchange, Lotus Notes Server, and Novell GroupWise; sendmail-based servers refer to a number of variations of servers originally based upon the sendmail program developed for the UNIX operating systems. A large number of e-mail clients have also been developed that allow a user to retrieve and view e-mail messages from a server; example products include Microsoft Outlook, Microsoft Outlook Express, Netscape Messenger, and Eudora. In addition, some e-mail servers, or e-mail servers in conjunction with a Web server, allow a Web browser to act as an e-mail client using the HTTP standard.

As the Internet has become more widely used, it has also created new risks for corporations. Breaches of computer security by hackers and intruders and the potential for compromising sensitive corporate information are a very real and serious threat.

Wireless Local Area Networks (WLANs) offer a quick and effective extension of a wired network or standard local area network (LAN). FIG. 1 depicts a typical LAN 190 including both wired and wireless components. The wired component depicted in FIG. 1 includes a variety of connected systems including local servers 120, local clients 130 and network accessible data storage components 110. By simply installing access points 180A, 180B to the wired network (e.g., Ethernet 150 and router 140), personal computers and laptops equipped with WLAN cards 170A, 170B can connect with the wired network at broadband speeds.

Over the last few years, most deployments of WLANs have conformed to the Institute of Electrical and Electronics Engineers (IEEE) 802.11b standard that operates over the unregulated 2.4 GHz frequency spectrum. The 802.11b standard offers connectivity of up to 11 Mbps—fast enough to handle large e-mail attachments and run bandwidth-intensive applications like video conferencing. While the 802.11b standard now dominates the WLAN market, other variations of the 802.11 standard, such as 802.11a, 802.11g, and 802.1X, are being developed to handle increased speeds. WLAN vendors have committed to supporting a variety of standards. The various 802.11 standards developed by the IEEE are available for download via URL: standards.ieee.org/getieee802/802.11.html; these various standards are hereby incorporated by this reference herein.

As businesses connected their LANs to the Internet 160, they installed firewalls 145 to protect their local networks and act as security gates to fend off unauthorized traffic coming from the Internet's information highway such as potential hacker 135. The mobility of air-bound, wireless networks creates security concerns where threats can come from any direction and are not limited to the wired infrastructure. Established security practices of guarding a few wired entry points to the network are no longer effective. A firewall 145 may effectively deter an attack from a wired hacker 135 via the Internet 160; however, wireless hackers 195A, 195B typically enter the LAN 190 through access points 180A, 180B that are already behind the firewall 145. Companies must constantly monitor their airwaves to survey wireless activity and guard against intruders.

Because wireless communication is broadcast over radio waves, eavesdroppers 195A, 195B who merely listen to the airwaves can easily pick up unencrypted messages. Additionally, messages encrypted with the Wired Equivalent Privacy (WEP) security protocol can be decrypted with a little time and easily available hacking tools. These passive intruders put businesses at risk of exposing sensitive information to corporate espionage.

The theft of an authorized user's identity poses one the greatest threats. Service Set Identifiers (SSIDs) that act as crude passwords and Media Access Control (MAC) addresses that act as personal identification numbers are often used to verify that clients are authorized to connect with an access point. However, existing encryption standards are not foolproof and allow knowledgeable intruders to pick up approved SSIDs and MAC addresses to connect to a WLAN as an authorized user with the ability to steal bandwidth, corrupt or download files, and wreak havoc on the entire network.

Outsiders who cannot gain access to a WLAN can nonethe-less pose security threats by jamming or flooding the airwaves with static noise that causes WLAN signals to collide and produce CRC errors. These Denial-of-Service (DoS) attacks effectively shut down the wireless network in a similar way that DoS attacks affect wired networks.

Careless and deceitful actions by both loyal and disgruntled employees also present security risks and performance issues to wireless networks with unauthorized access points, improper security measures, and network abuses. Because a simple WLAN can be easily installed by attaching a $150 access point to a wired network and a $100 WLAN card to a laptop, employees are deploying unauthorized WLANs or peer-to-peer wireless connections 175 when IT departments are slow to adopt the new technology.

Incorrectly configured access points are an avoidable but significant hole in WLAN security. Many access points are initially configured to broadcast unencrypted SSIDs of authorized users. While SSIDs are intended to be passwords to verify authorized users, intruders can easily steal an unencrypted SSID to assume the identity of an authorized user.

Authorized users can also threaten the integrity of the network with abuses that drain connection speeds, consume bandwidth, and hinder a WLAN's overall performance. A few users who clog the network by trading large files such as MP3 audio or MPEG video files can affect the productivity of everyone on the wireless network.

The systems and methods according to the present invention provide solutions to these and other security and/or management issues associated with WLANs and/or encrypted computer networks.

SUMMARY

The present invention is directed to systems and methods for enhancing network security. One preferred embodiment according to the present invention includes a system data store (SDS), a system processor and one or more interfaces to one or more communications channels which may include one or more interfaces to wireless and/or encrypted communications network over which electronic communications are transmitted and received. The SDS stores data needed to provide the desired system functionality and may include, for example, received communications, data associated with such communications, information related to known security risks and predetermined responses to the identification of particular security risks and situations. The SDS may include multiple physical and/or logical data stores for storing the various types of information. Data storage and retrieval functionality may be provided by either the system processor or data storage processors associated with the data store.

The system processor is in communication with the SDS via any suitable communication channel(s); the system processor is in communication with the one or more interfaces via the same, or differing, communication channel(s). The system processor may include one or more processing elements that provide electronic communication reception, transmission, interrogation, analysis and/or other functionality.

Each interface to a wireless network includes at least one receiver adapted to receive wireless communications; each interface may also, or instead, include one or more transmitters adapted to transmit wireless communications. Each interface to a wired network, if any, include a receiver, a transmitter, both or a plurality of one and/or both; such receivers and/or transmitters are adapted to receive or transmit communication over the wired network to which the interface connects. In one preferred embodiment, the communication interface includes at least one wireless transmitter.

Accordingly, one preferred method of security enhancement includes a variety of steps that may, in certain embodiments, be executed by the environment summarized above and more fully described below or be stored as computer executable instructions in and/or on any suitable combination of computer-readable media. An active defense request signal is received. The active defense request signal includes an indicator corresponding to an access point within the wireless computer network that is potentially compromised by an intruder. In response to the received signal, one or more active defense are triggered. In some preferred embodiments, the active defenses include jamming, CRC error generation, random frame transmission, network lock-down and/or dynamic channel change.

In some embodiments supporting dynamic channel change, a honeypot trap variation can be included. In such embodiments, a honeypot trap may be activated culminating in a channel change request to the potentially compromised access point. Configuration data associated with an access point on a wireless computer network potentially compromised by an intruder is received. Information contained within and/or derived from the received configuration data is stored. Communication with the intruder is continued by emulating the identification characteristics of the potentially compromised access point. In some embodiments, communication may appear to come from an access point that appears less secure than the potentially compromised access point. A channel change request is transmitted to the potentially compromised access point to reroute communication between the potentially compromised access point and authorized stations may continue to a different channel.

In some embodiments, the active defense request signal is received from an intrusion detection system such as described in greater detail below. In such embodiments, the indicator of the potentially compromised access point can be included as part of a generated active defense request signal. In other instances, an alarm signal is received that triggers the generation and transmission of a request for information regarding the potentially compromised access point. Some embodiments involving an intrusion detection system may include the intrusion detection system while others just respond to input from such a system.

Some embodiments further include the mapping of the identification of the intruder's node and/or the mapping of the location of the intruder's node within the wireless network. In some instances, a notification of the triggering of the active defense can be sent to an administrator; some such notifications may include an identification and/or location of the node associated with the intruder in embodiments that include node identification and location mapping.

In some embodiments, the configuration data includes one or more risk criteria, network default data, network policy, performance and/or usage data. This configuration information may be received from one or more of a variety of sources including from a configuration file, an interactive data entry interface or a command line or from monitoring the wireless computer network.

Some embodiments may further include updating of various types of stored information; different embodiment may update all, none or any combination of the various types of stored information. For instance, some embodiments can update station information associated with the various stations in the wireless computer network based upon the received data. Further, some embodiments can update state information regarding the security of the wireless computer network based upon the received data. In addition, some embodiments can update statistics based upon the received data. Such updates can occur each time data is received, in response to reaching a fixed amount of such update data, in response to reaching a fixed time or the end of a predetermined duration, or some combination of these approaches.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIGS. 2A-E graphically depicts LANs incorporating various preferred embodiments according to the present invention.

DETAILED DESCRIPTION

Figure 1:
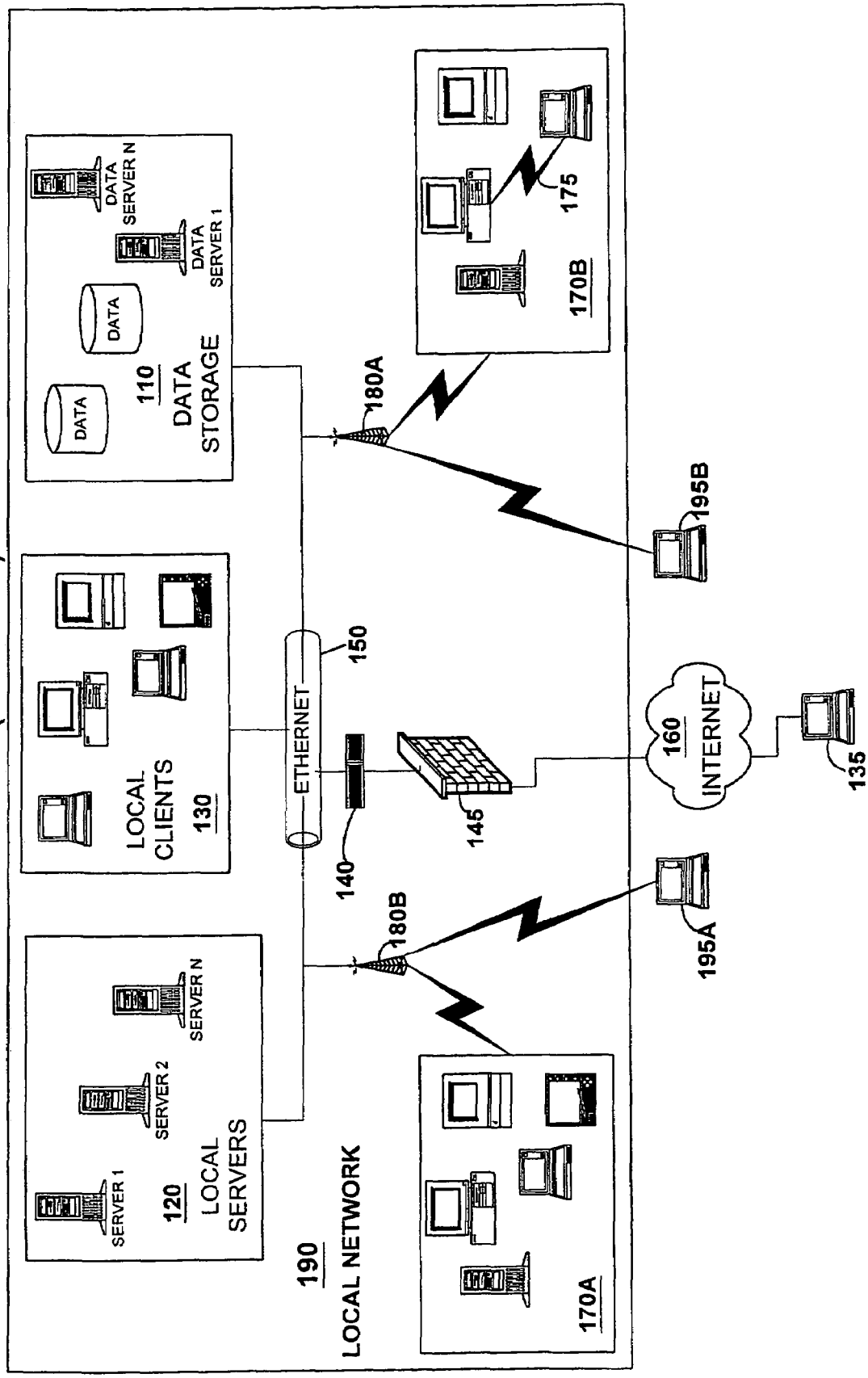
FIG. 1 graphically depicts a typical LAN with both wired and wireless components.

Exemplary embodiments of the present invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The term "Wi-Fi" is short for wireless fidelity and is another name for IEEE 802.11b. The foregoing discussion of exemplary embodiments may use terminology or make reference to the IEEE 802.11b standard, or other 802.11 variant; however, those skilled in the art will appreciate that systems and methods of the present invention may be applied to WLANs meeting these standards as well as WLANs developed according to competing WLAN standards. The phrase "frame" as used herein shall mean broadly any discretely defined communication transmitted via a computer network and shall not be limited to those specific frame types (control, management, data and error) defined according to 802.11X standards.

Architecture of a Typical Access Environment

FIGS. 2A-E depicts several LAN environments including several preferred embodiments according to the present invention. These figures depict a typical LAN environment as depicted in FIG. 1 having wired and wireless components. In contrast to FIG. 1, FIGS. 2A-E include one or more hardware components supporting preferred embodiments according to the present invention. The depicted hardware components include a system processor, an SDS and one or more interfaces to one or more wireless and/or encrypted communications network over which electronic communications are transmitted and received.

Figure 2A:
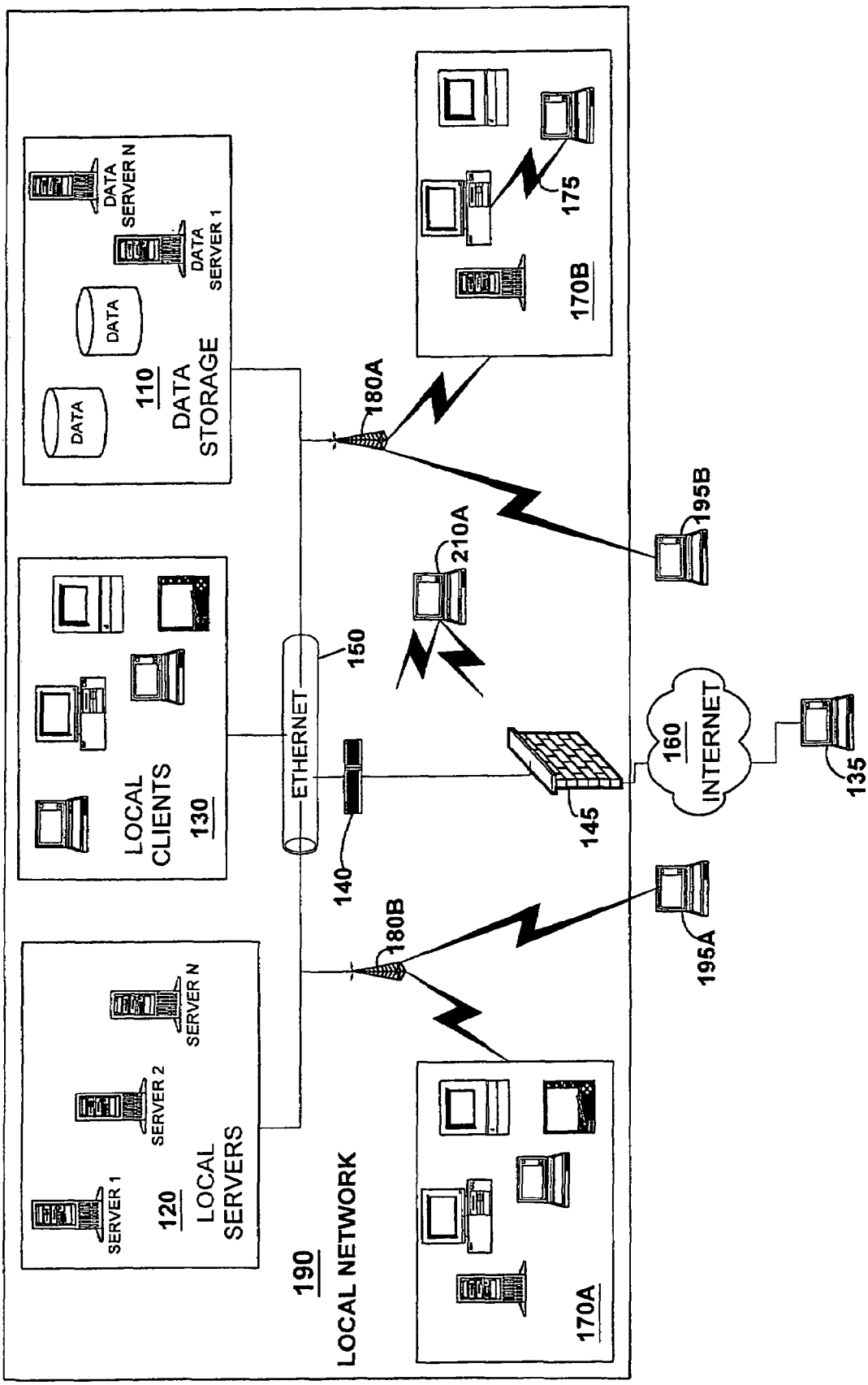

The hardware components depicted in these figures are outlined as follows:

In FIG. 2A, the hardware components include a single device 210A that includes the a local processor serving as the system processor and the one or more interfaces to the wireless network. The device 210A is preferably a mobile computer system such as a notebook computer. The local primary and/or secondary storage of device 210A may serve as the SDS; alternatively, portions of the SDS may be provided by other systems capable of communicating with the device 210A such as network addressable data storage 110, local servers 120 and/or wireless stations 170A, 170B. In some embodiments, the device's interfaces to the wireless network may be limited to one or more wireless receivers. In other embodiments, the interfaces may include one or more wireless transmitters as well as one or more transmitters. If wireless transmitters are included, the device 210 may communicate over LAN 190 using a wireless access point 180A, 180B. In addition, included wireless transmitters may be used to support one or more of the active defense measures described in greater detail below. In some embodiments, the device 210A may further include a wired connection (not shown) to Ethernet 150 allowing direct communication between it and systems connected to the wired portion of LAN 190.

Figure 2B:
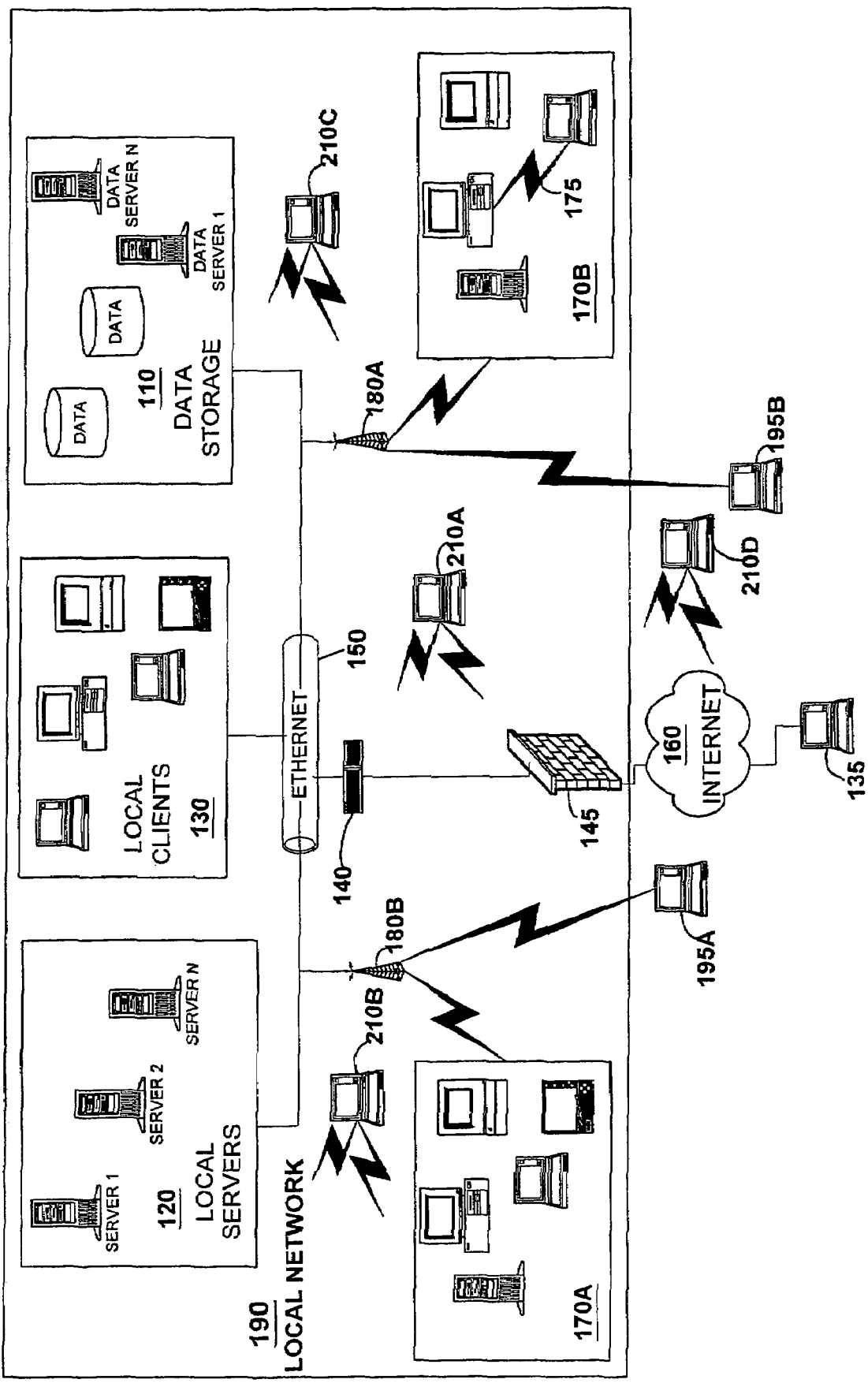

In FIG. 2B, the hardware components include multiple devices 210A, 210B, 210C, 210D. Each device 210A-D includes a local processor and one or more interfaces to the wireless network and is preferably a mobile computer system such as a notebook computer. The individual local processors in the aggregate serve as the system processor. The SDS may include a combination of storage local to each of the devices and/or external storage accessible via the LAN 190. As described above with respect to FIG. 2A, each device includes at least a wireless receiver but may also include additional wireless receivers and/or wireless transmitters. Each device may also include a wired connection (not shown) to Ethernet 150. Finally, the devices 210A-D may further use existing interfaces and/or incorporate additional interfaces to allow peer-to-peer communication among themselves.

Figure 2C:
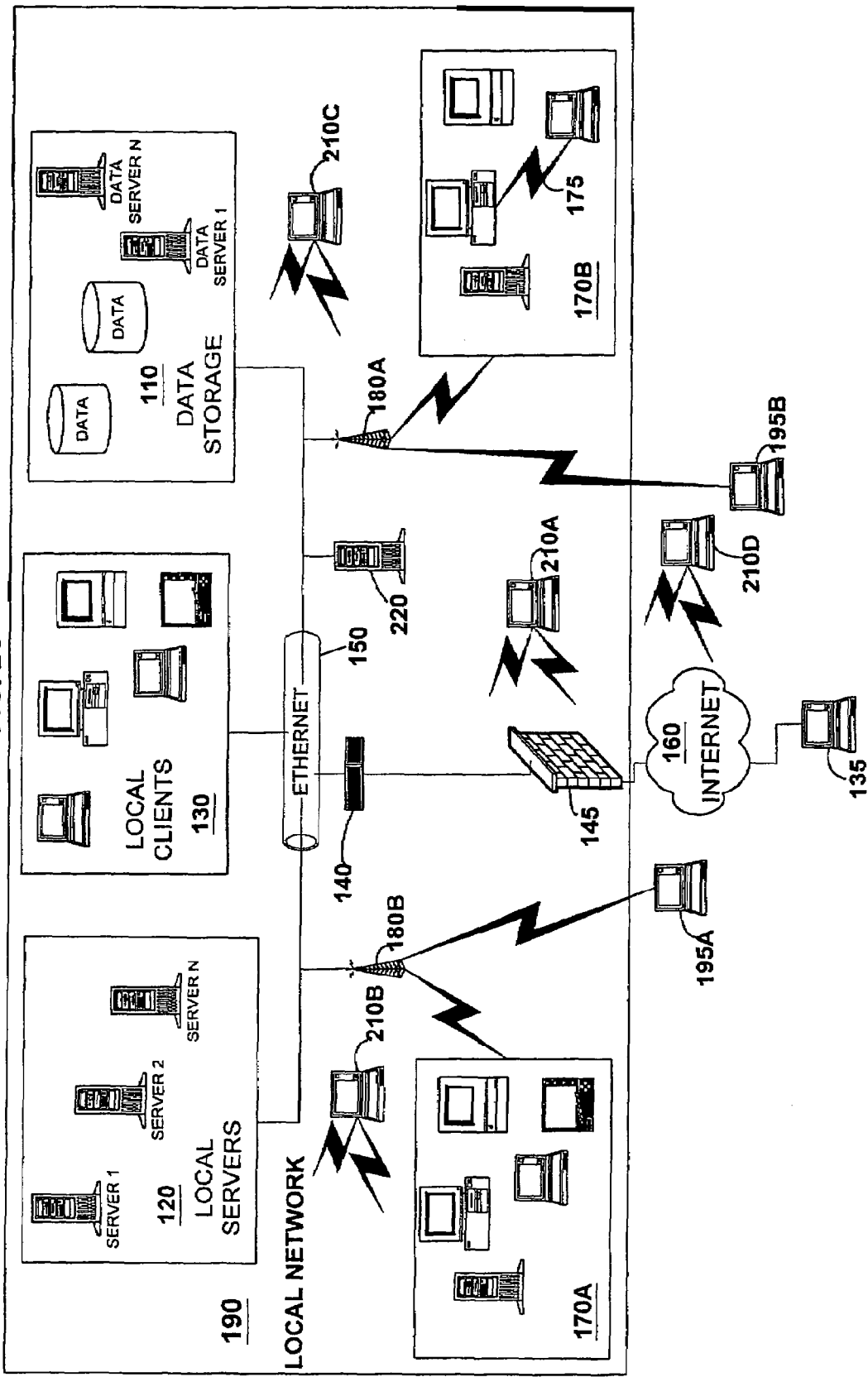

In FIG. 2C, the hardware components include multiple devices 210A, 210B, 210C, 210D, 220. Each device 210A-D may include the various components as described above with respect to FIG. 2B. Device 220 includes a local processor and one or more communication interfaces; this device may be referred to hereinafter as the host system. Device 220's communication interfaces may include only a wired communication interface and may receive data related to wireless communications as forwarded by devices 210A-D over the wire Ethernet 150. In addition to, or instead of, the wired communication interface, device 220 may include a one or more wireless communication interfaces each of which may include a wireless receiver, a wireless transmitter or both. In embodiment where devices 210A-D support peer-to-peer communication, device 220 may in some of such embodiments participate in the peer-to-peer communication and, in such instances, its communication interfaces would include the appropriate communication interface to support this participation. The system processor functionality in the depicted embodiment may be provided by the host system alone and/or by some combination of the devices 210A-D. The host system may in some embodiments provide the SDS for the environment; alternatively, the SDS may be supported by some combination of the local storage among the devices 210A-D, the local storage in the host system and external storage available through LAN 190.

Figure 2D:
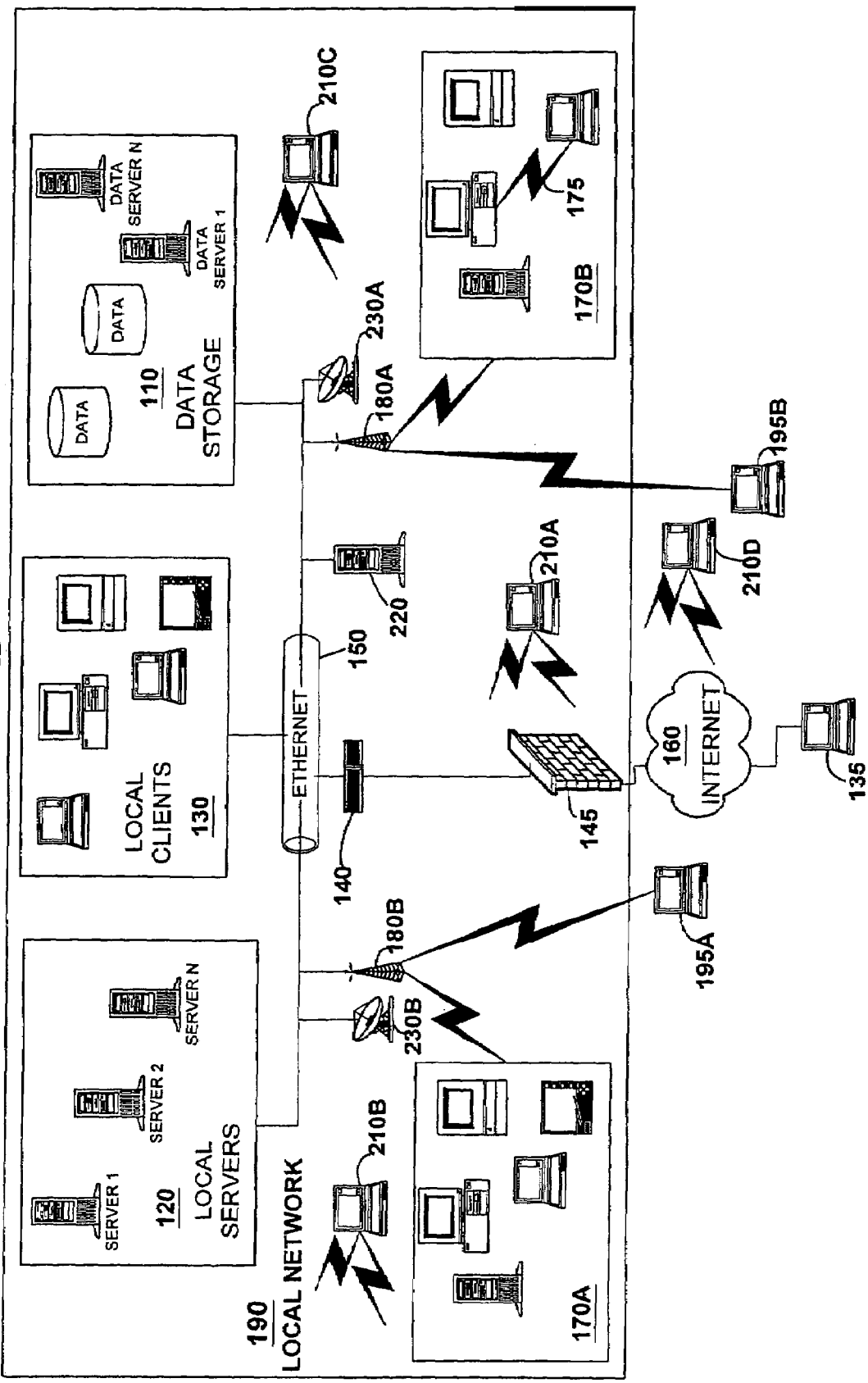

In FIG. 2D, the hardware components include multiple devices 210A, 210B, 210C, 210D, 220, 230A, 230B. Devices 210A-D, 220 support the same functionality and include the same range of components as provided above with respect to FIG. 2C. In addition, devices 230A, 230B are sensor devices that monitor wireless traffic over the wireless network. These sensor devices at least include a wireless receiver for monitoring the traffic and a communication interface wired (as depicted) or wireless (not shown) allowing communication with one or more of the devices 210A-D and/or the host system 220. In some embodiments, the sensor devices 230A, 230B may include a wireless transmitter for supporting communication with the other hardware components and/or for supporting various active wireless network defensive measures as discussed below. In some embodiments, the sensor device 230A, 230B may further include local processing capability and or local storage capability; in some such embodiments, the system processor and/or the SDS may incorporate these local capabilities of the sensor devices 230A, 230B.

In FIG. 2E, the hardware components include multiple devices 220, 230A, 230B. In this embodiment, the host system 220 and sensor devices 230A, 230B include the same functionality and range of components as discussed above with respect to FIGS. 2D and 2E respectively. In such embodiments, the host system 220 will typically provide a significant portion of the system processor functionality and will only have limited capacity to directly receive wireless network communication. In some of these embodiments, the host system 220 may have no wireless communication interface.

The depicted hardware components include a system processor potentially including multiple processing elements, that may be distributed across the depicted hardware components, where each processing element may be supported via Intel-compatible processor platforms preferably using at least one PENTIUM III or CELERON (Intel Corp., Santa Clara, Calif.) class processor; alternative processors such as UltraS- PARC (Sun Microsystems, Palo Alto, Calif.) could be used in other embodiments. In some embodiments, security enhancement functionality, as further described below, may be distributed across multiple processing elements. The term processing element may refer to (1) a process running on a particular piece, or across particular pieces, of hardware, (2) a particular piece of hardware, or either (1) or (2) as the context allows. The sensor devices 230A, 230B depicted in FIGS. 2D-E may in some preferred embodiments include more limited optimized local processors such as a digital signal processor (DSP). Other embodiment can use application specific integrated circuits (ASIC) or a field programmable gate arrays (FPGA).

The depicted hardware components include an SDS that could include a variety of primary and secondary storage elements. In one preferred embodiment, the SDS would include RAM as part of the primary storage; the amount of RAM might range from 64 MB to 4 GB in each individual hardware device although these amounts could vary and represent overlapping use such as where the host system 220 supports additional functionality such as integrated with firewall system 145 for providing unified wired and wireless security. The primary storage may in some embodiments include other forms of memory such as cache memory, registers, non-volatile memory (e.g., FLASH, ROM, EPROM, etc.), etc. The sensor devices 230A, 230B depicted in FIGS. 2D-E may in some preferred embodiments include more limited amounts and kinds of primary storage. In one preferred embodiments, the primary storage in the sensor devices includes FLASH memory.

The SDS may also include secondary storage including single, multiple and/or varied servers and storage elements. For example, the SDS may use internal storage devices connected to the system processor. In embodiments where a single processing element supports all of the security analysis functionality, such as seen in FIGS. 2A and 2E, a local hard disk drive may serve as the secondary storage of the SDS, and a disk operating system executing on such a single processing element may act as a data server receiving and servicing data requests.

It will be understood by those skilled in the art that the different information used in the security enhancement processes and systems according to the present invention may be logically or physically segregated within a single device serving as secondary storage for the SDS; multiple related data stores accessible through a unified management system, which together serve as the SDS; or multiple independent data stores individually accessible through disparate management systems, which may in some embodiments be collectively viewed as the SDS. The various storage elements that comprise the physical architecture of the SDS may be centrally located, or distributed across a variety of diverse locations.

The architecture of the secondary storage of the system data store may vary significantly in different embodiments. In several embodiments, database(s) are used to store and manipulate the data; in some such embodiments, one or more relational database management systems, such as DB2 (IBM, White Plains, N.Y.), SQL Server (Microsoft, Redmond, Wash.), ACCESS (Microsoft, Redmond, Wash.), ORACLE 8i (Oracle Corp., Redwood Shores, Calif.), Ingres (Computer Associates, Islandia, N.Y.), MySQL (MySQL AB, Sweden) or Adaptive Server Enterprise (Sybase Inc., Emeryville, Calif.), may be used in connection with a variety of storage devices/file servers that may include one or more standard magnetic and/or optical disk drives using any appropriate interface including, without limitation, IDE and SCSI. In some embodiments, a tape library such as Exabyte X80 (Exabyte Corporation, Boulder, Colo.), a storage attached network (SAN) solution such as available from (EMC, Inc., Hopkinton, Mass.), a network attached storage (NAS) solution such as a NetApp Filer 740 (Network Appliances, Sunnyvale, Calif.), or combinations thereof may be used. In other embodiments, the data store may use database systems with other architectures such as object-oriented, spatial, object-relational or hierarchical.

Instead of, or in addition to, those organization approaches discussed above, certain embodiments may use other storage implementations such as hash tables or flat files or combinations of such architectures. Such alternative approaches may use data servers other than database management systems such as a hash table look-up server, procedure and/or process and/or a flat file retrieval server, procedure and/or process. Further, the SDS may use a combination of any of such approaches in organizing its secondary storage architecture.

The hardware components may each have an appropriate operating system such as WINDOWS/NT, WINDOWS 2000 or WINDOWS/XP Server (Microsoft, Redmond, Wash.), Solaris (Sun Microsystems, Palo Alto, Calif.), or LINUX (or other UNIX variant). In one preferred embodiment, the devices 210A-D and/or host system 220 include a LINUX (or other UNIX variant) operating system; although other embodiments may include a WINDOWS/XP (or other WINDOWS family) operating system.

Depending upon the hardware/operating system platform of the overall environment, appropriate server software may be included to support the desired access for the purpose of configuration, monitoring and/or reporting. Web server functionality may be provided via an Internet Information Server (Microsoft, Redmond, Wash.), an Apache HTTP Server (Apache Software Foundation, Forest Hill, Md.), an iPlanet Web Server (iPlanet E-Commerce Solutions—A Sun—Netscape Alliance, Mountain View, Calif.) or other suitable Web server platform. The e-mail services may be supported via an Exchange Server (Microsoft, Redmond, Wash.), sendmail or other suitable e-mail server. Some embodiments may include one or more automated voice response (AVR) systems that are in addition to, or instead of, the aforementioned access servers. Such an AVR system could support a purely voice/telephone driven interface to the environment with hard copy output delivered electronically to suitable hard copy output device (e.g., printer, facsimile, etc.), and forward as necessary through regular mail, courier, inter-office mail, facsimile or other suitable forwarding approach.

In one preferred embodiment, devices 210A-D and host system 220 can be configured locally or remotely, and configuration can occur through an interactive interface and/or through a command line interface. The interactive interface is accessible locally whereas the command line interface is accessible either locally or remotely. Remote access is preferably granted through the use of a secure shell (SSH) client communicating with an SSH server running on the device or host system.

In some preferred embodiments of the present invention, an interactive interface is provided for configuring the access point and various hardware components and supplying a variety of configuration data including thresholds values of various kinds. In one preferred embodiment, an administration program area provides such an interface and allows:

definition and configuration of access point settings and policies;
  creation and/or designation of thresholds used to trigger intrusion/detection alarms for authorized access points;
  creation and/or designation of default thresholds used to trigger intrusion/detection alarms for non-authorized access points; and
  configuration of settings for the various hardware/software components.

The administration program area, in one preferred embodiment, offers standard windowing interface featuring tabbed pages for easy navigation between configuration functions. From within each of the tabbed pages, an Edit button allows modification of the values. After editing the data, Accept temporarily saves the changes. Commit permanently saves and applies edits (until edited again). Accepted changes persist until the system is restarted whereas committed changes persist until across restarts.

Access Point Configuration

One preferred embodiment automatically attempts to detect and record all the configured properties for all access points it observes. The settings constitute access point "policies"—when access point properties deviate from those recorded, one or more alarms can be generated. The values for an access point can be modified manually to alter the generation of specific alarms. Policies for off-line access points can also be created in some embodiments using an Add feature.

The table below provides a summary of several access point properties displayable and/or configurable in some preferred embodiments of the present invention.

restart) or persistent across restarts (until a further edit designated as persistent).

| Values | Description |
|---|---|
| Signal Strength Threshold | If the signal strength for any station in the BSS is lower than this value, an alarm can be generated. |
| # of Associations per Minute | Enter the maximum number of associations per minute to allow with all stations combined. (Preferably, this value is not higher than twice the number of stations in the BSS.) |
| # of Associated Stations | Enter the maximum number of stations allowed to associate at any one time with this access point. The number should reflect the actual number of stations. If a greater number is detected, an alarm can be generated. |

| Values | Description |
|---|---|
| Access Point ID | The MAC address of the access point. |
| Access Point Name | The user-defined name of the access point. |
| Extended Service Set ID | The name of the Extended Service Set indicating the wireless network to which the access point belongs. |
| Access Point Vendor | The manufacturer of the access point. In some embodiments, this is detected by comparing the first three bytes of its MAC address with a database of OUI numbers. |
| Supported Rates | The data transfer rates the access point supports. In some embodiments, this value (or these values) can be edited to specify the supported rates. |
| Authentication Modes | Whether the access point accepts non-authenticated network connections and/or also accepts shared key authentication. (If connections are detected that deviate from either of these settings, an alarm can be generated.) |
| Configured to Run WEP | Whether or not the access point is configured to require WEP encryption. |
| AP Mgmt From Wireless Network | Whether the access point is configured to allow users to directly administer its settings over the wireless network. |
| Authorized Access Point | Whether this access point is authorized to be present in the air space. Unauthorized access points, when detected, can generate alarms. (In some embodiment, a change in this value will not take effect until the system is restarted.) |

For each access point, a station maintenance screen or menu may allow the specification of the stations that are authorized to use it. One preferred embodiment of such a screen or menu, automatically detects all stations within the footprint of the access point's Basic Service Set (BSS) and enters their MAC addresses in an Observed column. Such stations can be indicated as an authorized member of the BSS by selecting them in the Observed column and designating them as Valid. Designated stations are moved to a Valid column. (Stations can, in some embodiments, be designated as invalid by selecting and marking them in the Valid column.) Stations not auto-detected can be manually entered by specifying its MAC address in a Enter New Station input field and triggering an Add Station feature.

Access Point Threshold Configuration and Aggregate Station Thresholds

Systems and methods according to the present invention generate alerts if network traffic that exceeds thresholds is detected. In one preferred embodiment, all detected or manually configured off-line access points are listed in a Select AP pick list. Thresholds associated with each access point in the pick list can be edited by selecting the particular access point. Such threshold values can be either temporary (until the next The following table outlines a set of thresholds used in one preferred embodiment that refer to the network characteristics encompassing all stations and traffic in the BSS. In one preferred embodiment, special care must be taken when creating the "byte thresholds" that immediately follow. Several factors govern the values entered for each:

The "transmission rate" of the access point—how much data it can transmit—is the first consideration. If the transmission rate is only 1 megabyte per second, the thresholds will be much lower than if the transmission rate is 11 megabytes per second.

All four "directions" of traffic (wired to wired, wired to wireless, wireless to wired, and wireless to wireless) must add up to less than 100% of available bandwidth. Many administrators will set the individual thresholds such that their combined value is less than 80% of available bandwidth.

| Value | Description |
| --- | --- |
| # Bytes into BSS from Wired Net | Enter the maximum number of bytes of data per minute allowed into the BSS from the wired portion of your network. If a greater number is detected, an alarm can be generated. |
| # Bytes from BSS to Wired Net | Enter the maximum number of bytes of data per minute allowed out of the BSS to a wired portion of your network. If a greater number is detected, an alarm can be generated. |
| # Bytes between Stations in BSS | Enter the maximum number of bytes of data per minute allowed to be transmitted within the BSS from all stations. If a greater number is detected, an alarm can be generated. |
| # Bytes from Wired Net to Wired Net | Enter the maximum number of bytes of data per minute allowed to be transmitted from a wired portion of the network to another wired portion of the network, using the access point as a bridge. If a greater number is detected, an alarm can be generated. |
| Total Data Frames Seen | Enter the maximum number of data frames per minute from all stations combined allowed to be transmitted. If a greater number is detected, an alarm can be generated. |
| Total Mgmt Frames Seen | Enter the maximum number of management frames per minute from all stations combined allowed to be transmitted. If a greater number is detected, an alarm can be generated. |
| Total Ctrl Frames Seen | Enter the maximum number of control frames per minute from all stations combined allowed to be transmitted. If a greater number is detected, an alarm can be generated. |
| Total Ad hoc Frames Seen | Enter the maximum number of ad hoc frames per minute from all stations combined allowed to be transmitted. If a greater number is detected, an alarm can be generated. |

Individual Station Thresholds

The following table outlines a set of potential thresholds applied to any individual station in one preferred embodiment. If any single station reaches one of these thresholds, an alarm can be generated.

| Column | Description |
| --- | --- |
| Signal Strength Threshold | If the signal strength for any station in the BSS is lower than this value, an alarm can be generated. |
| # of Associations per Minute | Enter the maximum number of associations per minute any station is allowed to make with an access point. If a greater number is detected, an alarm can be generated. |
| # of Bytes Transmitted | Enter the maximum number of bytes of data per minute any station is allowed transmit. If a greater number is detected, an alarm can be generated. |
| # of Bytes Received | Enter the maximum number of bytes of data per minute any station is allowed to receive. If a greater number is detected, an alarm can be generated. |
| # of Data Frames Transmitted | Enter the maximum number of data frames per minute any station is allowed to transmit. If a greater number is detected, an alarm can be generated. |
| # of Data Frames Received | Enter the maximum number of data frames per minute any station is allowed to receive. If a greater number is detected, an alarm can be generated. |
| # of Mgmt Frames Transmitted | Enter the maximum number of management frames per minute any station is allowed to transmit. If a greater number is detected, an alarm can be generated. |
| # of Mgmt Frames Received | Enter the maximum number of management frames per minute any station is allowed to receive. If a greater number is detected, an alarm can be generated. |
| # of Ctrl Frames Transmitted | Enter the maximum number of control frames per minute any station is allowed to transmit. If a greater number is detected, an alarm can be generated. |
| # of Ctrl Frames Received | Enter the maximum number of control frames per minute any station is allowed to receive. If a greater number is detected, an alarm can be generated. |
| # of Fragment Frames Seen | Enter the maximum number of fragment frames per minute from any station that are allowed. If a greater number is detected, an alarm can be generated. |
| # of Decrypt Error Frames Seen | Enter the maximum number of decrypt error frames per minute from any station that are allowed. If a greater number is detected, an alarm can be generated. |

Access Point Station Thresholds

The following table outlines a set of thresholds, in one preferred embodiment, applied to the access point itself, and will typically be somewhat more than the Aggregate Station thresholds.

| Column | Description |
| --- | --- |
| Signal Strength Threshold | If the signal strength for any frame is lower than this value, an alarm can be generated. |
| # of Associations per Minute | Whereas stations must associate with an access point, access points do not associate with themselves. Therefore, this value should be zero, indicating that it does not associate. |
| # of Bytes Transmitted | Enter the maximum number of bytes of data per minute this access point is allowed to transmit. If a greater number is detected, an alarm can be generated. |
| # of Bytes Received | Enter the maximum number of bytes of data per minute this access point is allowed to receive. If a greater number is detected, an alarm can be generated. |
| # of Data Frames Transmitted | Enter the maximum number of data frames per minute this access point is allowed to transmit. If a greater number is detected, an alarm can be generated. |
| # of Data Frames Received | Enter the maximum number of data frames per minute this access point is allowed to receive. If a greater number is detected, an alarm can be generated. |
| # of Mgmt Frames Transmitted | Enter the maximum number of management frames per minute this access point is allowed to transmit. If a greater number is detected, an alarm can be generated. |
| # of Mgmt Frames Received | Enter the maximum number of management frames per minute this access point is allowed to receive. If a greater number is detected, an alarm can be generated. |
| # of Ctrl Frames Transmitted | Enter the maximum number of control frames per minute this access point is allowed to transmit. If a greater number is detected, an alarm can be generated. |
| # of Ctrl Frames Received | Enter the maximum number of control frames per minute this access point is allowed to receive. If a greater number is detected, an alarm can be generated. |
| # of Fragment Frames Seen | Enter the maximum number of fragment frames per minute this access point can see before generating an alarm. |
| # of Decrypt Error Frames Seen | Enter the maximum number of decrypt error frames per minute this access point can see before generating an alarm. |

Default Threshold Information

In one preferred embodiment, whenever a new access point is detected or manually entered, the specified default settings are applied until it is manually customized. It is assumed that new or unauthorized access points are potential hackers, so it is preferable to set the default thresholds fairly low.

Aggregate Station Thresholds

The table below outlines a set of thresholds that refer to the combined statistics for all stations in one preferred embodiment.

| Column | Description |
| --- | --- |
| Signal Strength Threshold | If the signal strength for any station in the BSS associated with an unknown access point is lower than this value, an alarm can be generated. |
| # of Associations per Minute | Whereas stations must associate with an access point, access points do not associate with themselves. Therefore, this value should be zero, indicating that it does not associate. |
| # of Associated Stations | Enter the maximum number of stations allowed to associate with unknown access points. The number should reflect your actual stations. If a greater number is detected, an alarm can be generated. |
| # Bytes into BSS from Wired Net | Enter the maximum number of bytes of data per minute allowed into the BSS through unknown access points from the wired portion of your network. If a greater number is detected, an alarm can be generated. |
| # Bytes from BSS to Wired | Enter the maximum number of bytes of data per minute allowed out of the BSS through unknown access points to a wired portion of |

-continued

| Column | Description |
| --- | --- |
| Net | your network. If a greater number is detected, an alarm can be generated. |
| # Bytes between Stations in BSS | Enter the maximum number of bytes of data per minute allowed to be transmitted within the BSS from all stations through unknown access points. If a greater number is detected, an alarm can be generated. |
| # Bytes from Wired Net to Wired Net | Enter the maximum number of bytes of data per minute allowed to be transmitted through unknown access points from a wired portion of the network to another wired portion of the network, using the access point as a bridge. If a greater number is detected, an alarm can be generated. |
| Total Data Frames Seen | Enter the maximum number of data frames per minute for all stations combined allowed to be transmitted through unknown access points. If a greater number is detected, an alarm can be generated. |
| Total Mgmt Frames Seen | Enter the maximum number of management frames per minute for all stations combined allowed to be transmitted through unknown access points. If a greater number is detected, an alarm can be generated. |
| Total Ctrl Frames Seen | Enter the maximum number of control frames per minute for all stations combined allowed to be transmitted through unknown access points. If a greater number is detected, an alarm can be generated. |
| Total Ad hoc Frames Seen | Enter the maximum number of ad hoc frames per minute for all stations combined allowed to be transmitted through unknown access points. If a greater number is detected, an alarm can be generated. |

Individual Station Thresholds

The set of thresholds outlined in the table below apply to any individual station in one preferred embodiment, and will typically be lower than the Aggregate Station thresholds.

| Column | Description |
| --- | --- |
| Signal Strength Threshold | If the signal strength for any station associated with an unknown access point is lower than this value, an alarm can be generated. |
| # of Associations per Minute | Enter the maximum number of associations per minute any station is allowed to make with an unknown access point. If a greater number is detected, an alarm can be generated. |
| # of Bytes Transmitted | Enter the maximum number of bytes of data per minute any station is allowed transmit through unknown access points. If a greater number is detected, an alarm can be generated. |
| # of Bytes Received | Enter the maximum number of bytes of data per minute any station is allowed to receive through unknown access points. If a greater number is detected, an alarm can be generated. |
| # of Data Frames Transmitted | Enter the maximum number of data frames per minute any station is allowed to transmit through unknown access points. If a greater number is detected, an alarm can be generated. |
| # of Data Frames Received | Enter the maximum number of data frames per minute any station is allowed to receive through unknown access points. If a greater number is detected, an alarm can be generated. |
| # of Mgmt Frames Transmitted | Enter the maximum number of management frames per minute any station is allowed to transmit through unknown access points. If a greater number is detected, an alarm can be generated. |
| # of Mgmt Frames Received | Enter the maximum number of management frames per minute any station is allowed to receive through unknown access points. If a greater number is detected, an alarm can be generated. |
| # of Ctrl Frames Transmitted | Enter the maximum number of control frames per minute any station is allowed to transmit through unknown access points. If a greater number is detected, an alarm can be generated. |
| # of Ctrl Frames Received | Enter the maximum number of control frames per minute any station is allowed to receive through unknown access points. If a greater number is detected, an alarm can be generated. |
| # of Fragment Frames Seen | Enter the maximum number of fragment frames per minute from any station that are allowed. If a greater number is detected, an alarm can be generated. |
| # of Decrypt Error Frames Seen | Enter the maximum number of decrypt error frames per minute from any station that are allowed. If a greater number is detected, an alarm can be generated. |

Access Point Station Thresholds

The set of thresholds in the table below applies to all unauthorized access points in one preferred embodiment.

| Column | Description |
| --- | --- |
| Signal Strength Threshold | If the signal strength for any access point is lower than this value, an alarm can be generated. |
| # of Associations per Minute | Enter the maximum number of associations per minute between any access point and stations. (It is recommended that this value not be higher than twice the number of stations in your BSS.) |
| # of Bytes Transmitted | Enter the maximum number of bytes of data per minute allowed to be transmitted from any access point. If a greater number is detected, an alarm can be generated. |
| # of Bytes Received | Enter the maximum number of bytes of data per minute allowed to be received by any access point. If a greater number is detected, an alarm can be generated. |
| # of Data Frames Transmitted | Enter the maximum number of data frames per minute allowed to be transmitted by any Access point. If a greater number is detected, an alarm can be generated. |
| # of Data Frames Received | Enter the maximum number of data frames per minute allowed to be received by any access point. If a greater number is detected, an alarm can be generated. |
| # of Mgmt Frames Transmitted | Enter the maximum number of management frames per minute allowed to be transmitted by any access point. If a greater number is detected, an alarm can be generated. |
| # of Mgmt Frames Received | Enter the maximum number of management frames per minute allowed to be received by any access point. If a greater number is detected, an alarm can be generated. |
| # of Ctrl Frames Transmitted | Enter the maximum number of control frames per minute allowed to be transmitted by any access point. If a greater number is detected, an alarm can be generated. |
| # of Ctrl Frames Received | Enter the maximum number of control frames per minute allowed to be received by any access point. If a greater number is detected, an alarm can be generated. |
| # of Fragment Frames Seen | Enter the maximum number of fragment frames per minute allowed for any access point. If a greater number is detected, an alarm can be generated. |
| # of Decrypt Error Frames Seen | Enter the maximum number of decrypt error frames per minute allowed for any access point. If a greater number is detected, an alarm can be generated. |

Some embodiments may allow for self-configuration of some or all of the thresholds discussed above. Such self-configuration could occur through a learning mode in which the systems and methods according o the present invention monitor traffic on the wireless computer network for the first several hours or days after installation. In such a learning mode, alarm notifications can be disabled. It is expected that, in the beginning, the generation of alarms will be very high—hundreds or thousands per day depending on actual network traffic—until thresholds in accordance with the network's normal activity. Once an accurate picture of normal network traffic has been captured, and thresholds are reflective of normal activity, a switch to normal operations mode enables alarm notifications.

In one preferred embodiment, a command line interface is provided to configure settings that are not available within the graphical user interface. For example, the IP address of the a hardware component can be changed, its system clock reset or set to "sync" with a network time server. In other embodiments, the graphical user interface and/or the command line interface can allow significant overlap of configuration capability. Further, some embodiments have only one or the other interface type. Finally, some embodiments provide no interactive interface for configuration and are limited to reading configuration data from a file, deriving configuration data from past monitoring of the wireless computer network or otherwise receiving this data. The command line interface in one preferred embodiment can be accessed either on the hardware component such as through a command shell such as the Linux Gnome Terminal or over the network using an SSH (preferably, version 2) client.

In one preferred embodiment, a command shell automatically opens on the hardware component after booting. A terminal icon can appear on the task bar at the bottom of the display; clicking the icon opens additional terminal windows. At the command line prompt, a command is entered to launch the command line interface.

An SSH client is launched and connected to the hardware component's IP address. The identity of the user making the connection is verified. At the command line prompt, enter the following command to launch the command line interface:

Command Line Interface

In one preferred embodiment, the screen displays in the terminal window provide five "program areas":

Network—offering options to change IP address, DNS servers, hostname, domain name, mail server, ARP, and create "allow" and "deny" lists.

Date—allowing time and date editing, time zone setting, and configuration of an NTP server.

Service—providing tools to fine-tune the hardware component parameters, configure data management, and reboot and shut down the component.

Users—allowing creation, editing, and deletion of user accounts allowed access to the graphical user interface.

Help—tips on using the application, and detailed help topics.

Network

Opening the network settings program area, the following commands are available in one preferred embodiment:

| Command | Description |
| --- | --- |
| IP | IP address config<br>Allows modification of the IP address, Subnet mask, and default gateway for the hardware component logged onto.<br>The "IP configuration" screen opens, displaying the current network configuration and allows modification. |
| DNS | Define DNS servers<br>Adding or deleting a DNS nameserver.<br>The "Nameserver screen" opens, displaying your current DNS server's IP address and allows addition, deletion and modification.<br>Note: Multiple DNS servers can in some embodiments have an "order" for processing DNS requests. The first server on the list (identified by the numeral 1) is the first to offer name resolution; the second server on the list (identified by the numeral 2) is the second to process the request if the first is unable to do so. In order to change the order preference of multiple servers, all must be deleted and re-entered in the desired order for them to process DNS requests. |
| HNAME | Set hostname<br>Changing the name of the hardware component. The Hostname screen displays your current hostname and allows modification.<br>Bear in mind that whenever the hostname is changed, its name must also be modified in all devices that refer to it (e.g., DNS servers). |
| DNAME | Set domain name<br>Changing the domain to which the hardware component belongs. The Domain name screen displays your current domain name and allows modification.<br>Bear in mind that whenever the domain name is changed, it must also be modified in all devices that refer to it (e.g., DNS servers). |
| MRELAY | Config mail relay host<br>Configuring a hardware component to send alarms by email. The Mail relay host screen appears and allows entry of qualified hostnames.<br>In one embodiment, mail relay hosts may be referred to by IP address or fully qualified hostname (e.g., myhostname.mydomainname.com) of a mail server to process email alarm messages.<br>Note: the mail server must be configured to allow this appliance to relay email through it, or at least to direct its mail to another mail server that will relay it. |
| ARP | Config permanent ARP table<br>Creating a permanent ARP table. The ARP table screen displays your current ARP records and allows modification.<br>In order to protect connections between this hardware component and remote administrators from being hijacked by man-in-the-middle ARP "blasts" (that redirect traffic for this IP address to an alternate MAC address), it is preferable to create permanent ARP records for gateways and other important machines. |
| HALLOW | Configure/etc/hosts.allow file<br>Specifying which machines are allowed to connect to the hardware component. The Allow list screen displays your current list of allowed machines and allows modification.<br>Machines allowed to connect to this hardware components can be specified. Only those whose IP address, subnet, fully qualified hostname, or domain name match an entry in this list are allowed to connect to this hardware component to run the available administrative programs and routines. |
| HDENY | Config/etc/host.deny file<br>Identifying machines that may not connect to the hardware component. The Deny list screen displays your current list of denied machines and allows modification.<br>Machines not allowed to connect to this hardware component can be specified. Anyone whose IP address, subnet, fully qualified hostname, or domain name matches an entry in this list are not allowed to connect to this hardware component<br>Note: HALLOW, in one preferred embodiment, takes precedence over HDENY. For example, if 123.456.789.963 is on the allow list, yet the subnet 123.456.789. is on the deny list, the individual machine above is allowed to connect to the appliance. |

Date

Opening the date settings program area, the following commands are available in one preferred embodiment:

| Command | Description |
|---------|-------------|
| TIME | Time/Date config |
| | Allows configuration of the time/date for the hardware component. |
| TZ | Set time zone |
| | Allows configuration of the time zone for the hardware component. |
| NTP | Enable/disable NTP |
| | Allows configuration of the hardware component to use a network time server. |

Note:
If you change the system time because, for example, you move the appliance's location from the east to west coast of the United States, you must also locate a new network time server in the same time zone.

Services

Opening the set appliance parameters, configure data management, and restart or shutdown the system area, the following commands are available in one preferred embodiment:

| Command | Description |
|---------|-------------|
| TUNE | Tune appliance parameters |
| | Allows users to modify some of the core values related to the environment's functionality. |
| DMGT | Data management |
| | Allows users to modify how the environment stores its data. |
| REBOOT | Reboot system |
| | Allows graceful restart of the hardware component. |
| HALT | Halt system |
| | Allows graceful shutdown of the hardware component. |

Users

Opening the Users program area, the following commands are available in one preferred embodiment:

| Command | Description |
|---------|-------------|
| NEWU | Create user |
| EDITU | Edit user |
| DELU | Delete user |

The functionality of these features can in one preferred embodiment match with like functionality provided in a standard LINUX user management facility.

Various methods and functions as exhibited in various embodiments according to the present invention are described above and below with respect to network security enhancement. In some embodiments, one or more processors within architectures of the environments as described above may execute the steps in such methods and provide such functionality. The functionality may spread across multiple processing elements. In other embodiments, any suitable computer readable storage device, media or combination of devices and/or media, including primary storage such as RAM, ROM, cache memory, etc. or secondary storage such as magnetic media including fixed and removable disks and tapes; optical media including fixed and removable disks whether read-only or read-write; paper media including punch cards and paper tape; or other secondary storage as would be known to those skilled in the art, may store instruction that upon execution by one or more processors cause the one or more processors to execute the steps in such methods and to provide such functionality.

Vulnerability Assessment and Threat Identification

Vulnerability assessment is accomplished by analyzing WLAN traffic, discovering access points and workstations. The system determines how many bytes of data stations are sending and receiving, the mean signal strength for an entire day or the hi/low signal strength for each minute. It can distinguish between network traffic internal to the wireless network and traffic originating from or destined to the physical, wired-network and which stations are the largest senders and receivers of data. The system produces broad summaries of data that report high, low, and mean values for a variety of traffic parameters, and detailed views that show minute-by-minute snapshots of your traffic. Traffic parameters include the breakdown of frame traffic (control, management, data, and error frames) and network routing information. The system determines if any traffic has not been encrypted, users are authenticated, and all hardware is properly configured. The system detects rogue deployments by identifying and locating unauthorized WLANs and ad hoc networks (peer-to-peer networks) that violate company policy and jeopardize security. The system identifies suspicious WLAN traffic across unauthorized channels and frequencies, which can be a common sign of intruders accessing your WLAN or employees abusing their network privileges.

The systems and methods according to one preferred embodiment use an audit of existing wireless hardware and perform a survey the air space surrounding the wireless network prior to activating intrusion detection. In this way, a baseline activity level can be determined.

Step 1: Hardware Audit

Identify every access point in the wireless computer network. Obtain or determine for each its MAC address, Extended Service Set name, manufacturer, supported transmission rates, authentication modes, and whether or not it is configured to run Wired Equivalent Privacy (WEP) and wireless administrative management. In addition, identify every workstation equipped with a wireless network interface card, and record the MAC address of each device. Take note of any physical features in the environment (walls, competing electronic devices such as microwave ovens, cordless phones, etc.) that might interfere with wireless signals.

The hardware audit serve as the baseline against which the systems and methods according to the present invention can compare. That is, all access points and wireless stations should be detected by the various embodiments of the present invention. (If an access point or station is not detected, follow logical troubleshooting steps.) On the other hand, it is likely that more devices than expected will be detected. Some of these may be stations or access points not identified or of which no one was aware. Others may be "rogue" devices—surreptitious or unauthorized installations in the network—or harmless equipment belonging to nearby companies, and others may be actual hackers. Once the systems and methods according to the present invention are in intrusion detection mode, all detected access points and stations can be reported.

Step 2: Survey Perimeter

Preferably a mobile hardware component according to the present invention is walked around the perimeter of the wireless computer network in a powered up state (allowing it to collect data as it is moved), or placed in a central location for 12 to 24 hours to collect a larger amount of data. The benefit of a "walk-around" survey is that it generates a nearly immediate picture of the existing wireless "air space." The benefit of a "stationary" survey is that over a longer period of time, is greater certainty of detecting devices that only operate intermittently or hackers attempting to penetrate the network off-hours. Repetition of the survey, whether walking or stationary, should occur on all 11 channels.

Stationary Data Collection

Depending on the size of the wireless network, a hardware component can be placed at the four corners or at intermediate points in the Extended Service Set footprint. At each location, the component should be allowed to passively monitor network traffic for 12-24 hours. Hard copy of network data should be preserved prior to each move.

Walk-around Data Collection

Simply walk around the perimeter of the wireless network with the hardware component powered on and open to an overview screen. The various access points and stations within the wireless computer network can be detected. Compare this information with the hardware audit made prior to collecting this data. Repeat this walk-around survey for each of the eleven channels.

Step 3: Configure to "Recognize" this Network

Each access point detected should be designated as authorized or unauthorized. Each observed station should be designated as valid or not.

Step 4: Place Hardware Components in Discrete Locations Throughout the Wireless Network Leave a component in each location from 1-3 days. Each day, print reports to preserve captured information. Based upon this information, specific access point and station related thresholds can be tuned to distinguish between normal and abnormal traffic patterns.

Figure 3:
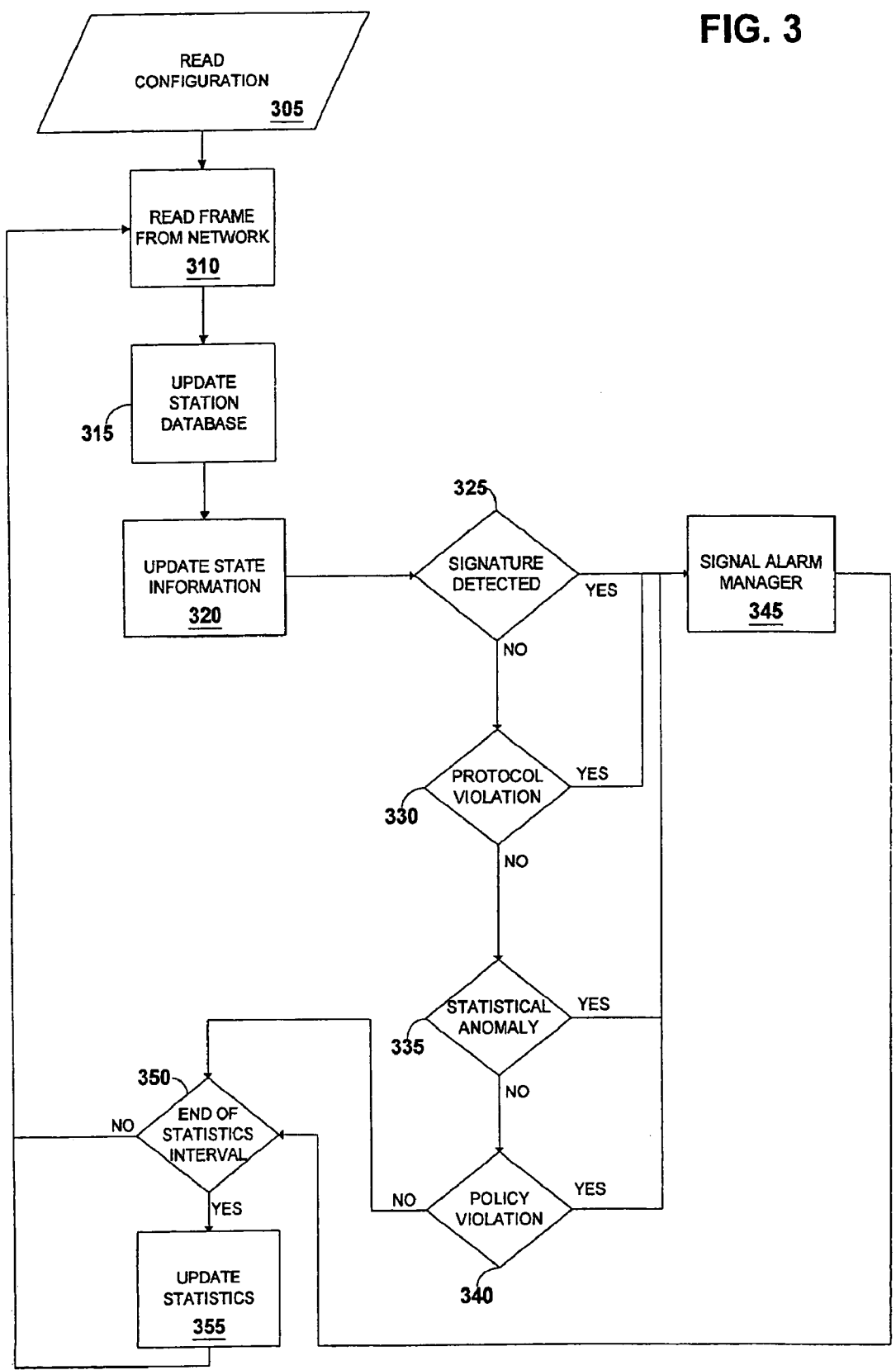
FIG. 3 is a flow chart of a multi-dimensional wireless intrusion detection process according to one preferred embodiment of the present invention.

The intrusion detection system (IDS) engine listens to wireless network traffic. FIG. 3 depicts one preferred process the IDS follows in evaluating data associated with received traffic. In the depicted exemplary process, all packets pass through four detections systems: signature-based testing, protocol-based testing, anomaly-based testing, and policy deviation-based testing; other embodiments may use one or more of these tests, or other tests, in varying combinations.

Initially, configuration information is received in step 305, typically including network default data and risk criteria. This information can be retrieved from a file, derived or obtained from monitoring the network and/or entered interactively at the outset of the process. The system reads or receives frames from the wireless network instep 310. The received frames are interrogated as follows.

The information within the frame is interrogated to determine if a known attack signature has been identified in step 325. Signatures encode datalink layer attack patters as combinations of packet sequences and state. For example, active probing emits a pattern or sequence of network requests. This sequence can be recognized by its packet sequence signature. If the attack signature is identified, the intrusion detection system signals an alarm manager to deliver an alert to the administrator in step 345.

If no attack signature is identified, the frame information is passed through a protocol violation engine to determine if the protocol used in the frame is authorized in step 330. Protocol analysis examines whether or not protocol usage is legitimate. For example, emitting a large number of association or disassociation requests in a short interval is not a legitimate use of the protocol. If the protocol used in the frame is outside of the authorized protocol set, the intrusion detection system signals an alarm manager to deliver an alert to the administrator in step 345.

If the protocol test passes, in step 335, the IDS checks the frame data for statistical anomalies against the SDS, or a statistics database maintained therein. Anomaly based detection computes such values as the mean, non-zero mean, standard deviation, autocorrelation and peak for each time slice throughout the day. This can be used to create a normalized statistics database for each time slice and user. Current activity is then monitored and compared with the recorded statistics vector. If the difference is larger than a configurable threshold, an alert is generated. Instead of, or in addition to, this approach, a Bayes test can be applied to deduce the probability that the current statistics vector is an attack as opposed to a legitimate sequence. If an anomaly exists, the intrusion detection system signals an alarm manager to deliver an alert to the administrator in step 345.

If no anomaly is detected, the system interrogates the frame to determine if a pre-defined policy has been violated in step 340. Policy testing compares the observed activity with a configurable set of activity rules stored in the SDS. For example, a rule can declare that only specific hosts with specific addresses and specific network cards can access the network. If a predefined policy has been violated, the intrusion detection system signals an alarm manager to deliver an alert to the administrator in step 345.

The tests outlined above and depicted in FIG. 3 are performed serially. In other embodiments, one or more of these tests may occur in parallel. Further, subsequent tests only occur if a prior test was passed. In a further preferred embodiment, all tests occur irrespective of the outcome of a prior test; consequently, a single read frame could potentially generate an alarm for every test performed on it.

Alerts can be in the any suitable form delivered to any suitable platform including, without limitation, a screen display to a monitor, a page to a pager, an outgoing voice call to telephone, a SMS message to a mobile telephone, an e-mail message to a valid address, posted to a Web page available via an appropriate Web server or WAP alert to a WAP enabled device. Various types of screen displays and reports may be used to provide information regarding generated alarms.

In one preferred embodiment referred to as AirDefense Mobile in U.S. Provisional Patent Application Ser. No. 60/381,829 entitled "SYSTEMS AND METHODS FOR NEWTORK SECURITY" filed May 20, 2002, preferred interfaces for reviewing and reporting alarms are described in detail. The contents of this application are hereby incorporated by this reference herein for all purposes.

In some embodiment, the outputs of all IDS test are then compared and a confidence level computed in step 345. In one such embodiment, in the case where only a statistical anomaly is detected, it is flagged as a lower level performance alert. In the case where one or more other violations are detected, the alarm is elevated to an intrusion alarm.

Some embodiments may use a variety of data stores in implementing the above process to track data across multiple iterations of the process; such data stores can in one preferred embodiment be part of an SDS as described above. Some such embodiments can include a statistics database, a station database and/or a state data store. In such embodiments, some or all of the following steps depicted in FIG. 3 can occur.

In step 315, a station database is updated. This database contains, in one preferred embodiment, per station and per access point records with information describing device address, communications state, timestamps of first and last activity, counts of byte transmissions and local policy information describing whether device is authorized or not for usage in the monitored network.

In step 320 state information is updated. State refers to whether or not the device has been seen before and whether or not the station is unauthenticated and unassociated, authenticated, authenticated and associated or unknown state information associated with the wireless computer network.

In step 350, a determination is made as to whether a particular statistics interval has been complete. If so, statistics in an SDS are updated in step 355, and processing continues with the next frame in step 310. Otherwise, processing simply continues in step 310 with the next reading or receiving of a frame.

Figure 4:
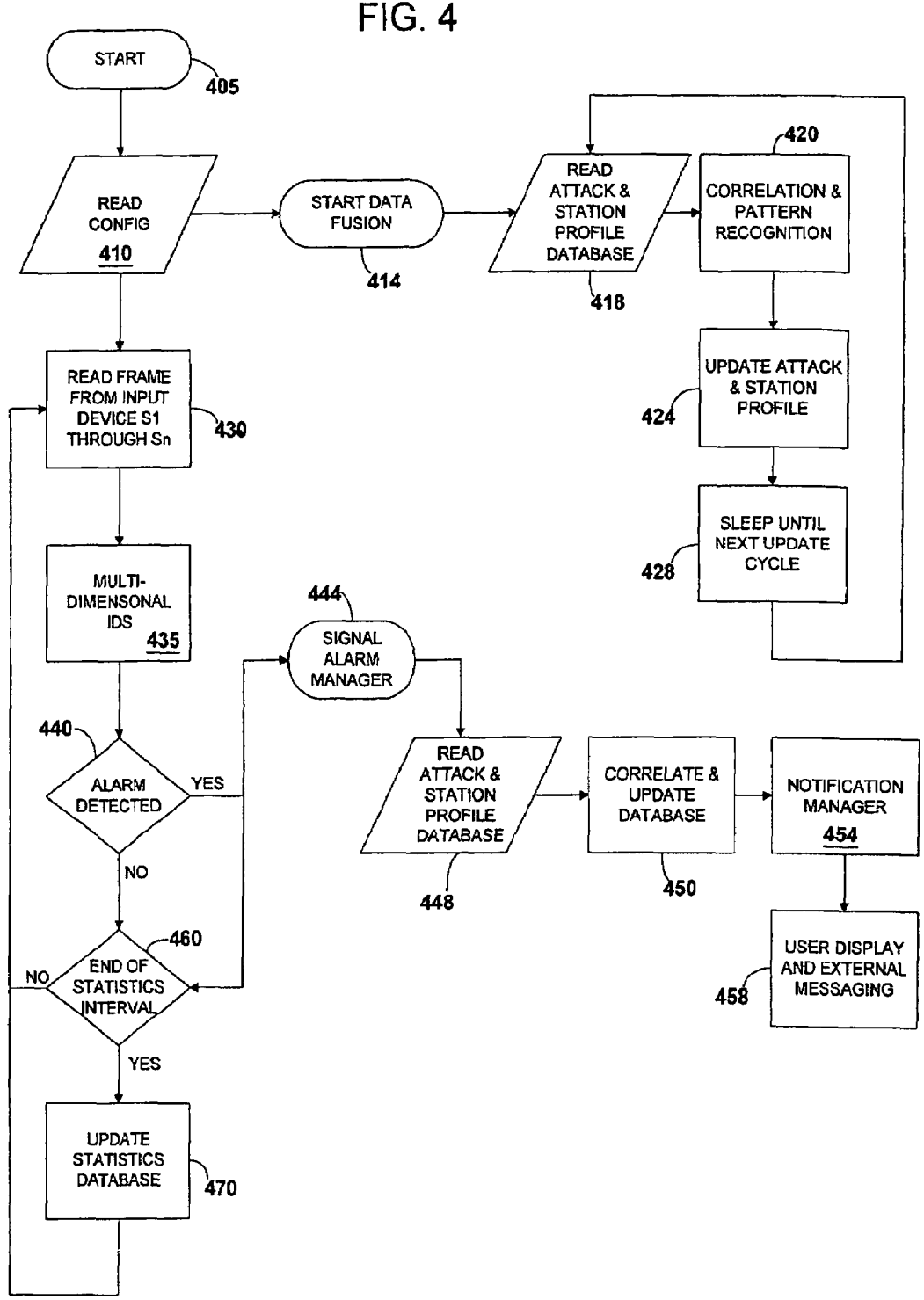
FIG. 4 is a flow chart of an example multiple input wireless intrusion detection process including multiple input correlation and long-term data fusion.

A modified and enhance version of the above approach is used where network traffic is monitored from multiple input devices such as with the embodiments depicted in FIGS. 2B-E. FIG. 4 depicts this enhanced process starting at step 405.

Step 410 is analogous to step 305 from the process of FIG. 3. In step 410, configuration information is received. As before, this is typically done through reading system configuration files, monitoring the network and/or interactive entry at the outset of the process. This information typically includes network default data and risk criteria such as access point configuration data (MAC Address of the access point, Access Point Name, etc.), station configuration data and various thresholds values.

In step 430, a wireless packet frame is received from each input device (e.g., hardware components 210A-D, host system 220 and/or sensors 230A, 230B). Frames are read so that the frame content can be interrogated.

Each read frame is interrogated by a multi-dimensional intrusion detection system (IDS) such as detailed above with respect to FIG. 3, and the outputs of all IDS tests are then compared and a confidence level computed in step 435. As with the process above, other tests in either alone, in combination with each other or in combination with one or more of those described above may be used in other embodiments.

In step 440, in the case where only a statistical anomaly is detected, it is flagged as a lower level performance alert. In the case where, in addition to the statistical anomaly, one of the other violations has been detected, the alarm is elevated to an intrusion alarm and an alarm manger is alerted in step 444. Other embodiments do not rely on aggregate test outcome but determine alarm status on single test outcomes. Further, some embodiments can use other test types and outcome combinations to determine type and severity of alarms generated.

If an alarm is not detected in step 440, a test to see if a predetermined interval for gathering statistics has been reached occurs in step 460. If the end of the pre-configured statistics gathering interval has occurred, the SDS is updated in step 470 to reflect the statistics gathered from the received frames over the interval. Statistics are gathered by monitoring traffic between network nodes, minute-by-minute statistics about BSS frame types and traffic volumes, summaries of transmission statistics for all stations associated with access points, current-minute transmission statistics for all Stations, and detailed minute-by-minute transmission statistics for any individual station in the wireless computer network.

Data fusion occurs on a batch basis by aggregating data from multiple databases. This process begins at step 414. The process integrates statistical data from multiple databases that is generated through frame monitoring and intrusion detection engines. This approach provides a methodology for managing data received from input devices such as hardware devices 210A-D and/or sensors 230A, 230B deployed at multiple sites and for aggregating enterprise data at a single central system such as host 220.

The Attack and Station Profile database is read at step 418 to begin a processing loop to integrate databases from separate sources. Correlation and pattern recognition is performed at step 420 to update the attack and station profiles in step 424. The processing loop then sleeps at step 428 until the next processing loop interval is to take place based on the pre-configured time interval or trigger.

After the alarm manager is signaled in step 444, the attack and station profile database is read in step 448; in this step, existing attacks are queried and existing station security state is queried. In step 450, this data is compared to the newly generated alarm. If it is sufficiently similar, no new external notification occurs in step 454. If it is not, a new notification message is generated in step 454 and console display and/or external messaging of the alarm occurs in step 458.

As described above, systems and methods according to the present invention can automatically generate alarms whenever certain events or conditions occur within your wireless network. In some embodiments, an alarm manager providing an interface for viewing can be provided; such an interface is described in greater detail in co-pending Ser. No. 60/381,029 "SYSTEMS AND METHODS FOR NEWTORK SECURITY" filed May 20, 2002. The following table identifies the alarms alarm subtypes and severities available in one preferred embodiment referred to as AirDefense Mobile.

| Active Defense | | |
| --- | --- | --- |
| Alarm Type | Alarm Subtype | Alarm Level |
| DoS Attack | De-authenticate<br>AirDefense Mobile detects when a hacker pretends to be an Access point and broadcasts a "de-authenticate" message. This forces all Stations to re-authenticate themselves, generating excessive network traffic, and causing inconsistent connectivity and data transfer. | Critical |
| | Disassociate<br>AirDefense Mobile detects when a hacker pretends to be an Access point and broadcasts a "disassociate" message. This forces all Stations to re-associate themselves with the Access Point, generating excessive network traffic, and causing inconsistent connectivity and data transfer. | Critical |
| Unauthorized Station | Not on allow list<br>AirDefense Mobile detects a Station whose MAC address is | Critical |

-continued

Active Defense

| Alarm Type | Alarm Subtype | Alarm Level |
|---|---|---|
| | not on its Valid list. (A Valid list is maintained by the system.) | |
| Threshold | GLB CRC errors<br>AirDefense Mobile detects if CRC errors exceeded configured limits (CRC errors are generated when checksums fail on individual frames.) | Major |
| | BSS assoc count<br>AirDefense Mobile detects when the number of associations within an entire BSS, in any given minute, exceed the number specified in configuration information | Major |
| | BSS signal strength<br>AirDefense Mobile detects when the signal strength in any access point falls below a specified threshold. | Critical |
| | BSS fragments<br>AirDefense Mobile detects when the number of fragmented frames within any minute exceed a specified threshold. | Minor |
| | BSS decrypt errors<br>AirDefense Mobile detects when the number of decrypt error frames within any minute exceed a specified threshold. | Major |
| | BSS assoc stations<br>AirDefense Mobile detects when the total number of associated Stations within an entire BSS, in any given minute, exceed a specified number. | Minor |
| | BSS tbw in<br>AirDefense Mobile detects when, during any minute, the number of bytes of data entering the BSS from the wired portion of your network exceed a set threshold. | Minor |
| | BSS tbw out<br>AirDefense Mobile detects when, during any minute, the total number of bytes of data going from the BSS to a wired portion of your network exceed a set threshold. | Minor |
| | BSS tbw intra<br>AirDefense Mobile detects when, during any minute, the total number of bytes of data originating from and destined for the BSS exceed a specified threshold. | Minor |
| | BSS tbw thru<br>AirDefense Mobile detects when, during any minute, the total number of bytes of data originating from a wired portion of the network hop through the BSS to another wired portion of the network exceed a set threshold. | Minor |
| | BSS data<br>AirDefense Mobile detects when, during any minute, the total number of data frames in the BSS exceed a specified threshold. | Major |
| | BSS mgt<br>AirDefense Mobile detects when, during any minute, the total number of management frames in the BSS exceed a specified threshold. | Major |
| | BSS ctl<br>AirDefense Mobile detects when, during any minute, the total number of control frames in the BSS exceed a set threshold. | Major |
| | BSS ad hoc<br>AirDefense Mobile detects when, during any minute, the total number of Ad Hoc frames in the BSS exceed a specified threshold.<br>Note: Wireless network adaptor cards of lesser quality will randomly generate Ad Hoc frames. AirDefense Mobile's default threshold (1) may cause all of these spurious frames to generate an alarm. After monitoring the network for a week or two, it may be advisable to set the threshold to a number at or a little higher than what the network normally generates. | Critical |
| | STA assoc count<br>AirDefense Mobile detects, during any minute, when any Station associates with an access point more times than provided by a specified threshold. | Major |
| | STA signal strength<br>AirDefense Mobile detects, during any minute, when any station's signal strength falls below a value specified. | Critical |
| | STA fragments<br>AirDefense Mobile detects, during any minute, when any station generates more fragmented frames than a specified value. | Minor |
| | STA decrypt errors<br>AirDefense Mobile detects, during any minute, when any | Major |

-continued

Active Defense

| Alarm Type | Alarm Subtype | Alarm Level |
|---|---|---|
| | station generates more decrypt errors than a set threshold. | |
| | STA tbw received | Minor |
| | AirDefense Mobile detects, within any minute, when any station receives more bytes of data than a predetermined threshold. | |
| | STA tbw transmitted | Minor |
| | AirDefense Mobile detects, within any minute, when any station transmits more bytes of data than specified in a set threshold. | |
| | STA data received | Major |
| | AirDefense Mobile detects, within any minute, when any station receives more data frames than a specified threshold. | |
| | STA data transmitted | Major |
| | AirDefense Mobile detects, within any minute, when any station transmits more data frames than a specified threshold. | |
| | STA mgt received | Major |
| | AirDefense Mobile detects, within any minute, when any station receives more management frames than a specified threshold. | |
| | STA mgt transmitted | Major |
| | AirDefense Mobile detects, within any minute, when any station transmits more management frames than a set threshold. | |
| | STA ctl receive | Major |
| | AirDefense Mobile detects, within any minute, when any station receives more control frames than a specified threshold. | |
| | STA ctl transmit | Major |
| | AirDefense Mobile detects, within any minute, when any station transmits more control frames than a set threshold. | |
| ID Theft | Out of sequence | Critical |
| | AirDefense Mobile detects when frames are transmitted out of sequence. This suggests that someone has spoofed a Station and is sending data at the same time as the legitimate Station. | |
| | Vendor out of character | Critical |
| | AirDefense Mobile compares every Station's transmissions against an internal database of known vendor "transmission profiles" or "signatures." If the actual network traffic does not match the vendor-profile associated with the Station's Wireless NIC, AirDefense Mobile assumes that the traffic originates from an unauthorized station using a spoofed NIC. | |
| | Anomalous signal strength | Critical |
| | AirDefense Mobile tracks the high, low, and mean signal strength of each station many times a minute throughout the day. Whenever it detects that the Station's signal strength deviates from the norm, it generates an alarm. | |
| Access Point Mode | WEP mode changed | Critical |
| | AirDefense Mobile detects when the WEP value in an access point's beacon differs from the value it is supposed to be. (AirDefense Mobile auto-detected the WEP property, or it was manually entered.) | |
| | Rate changed | Critical |
| | AirDefense Mobile detects when the supported transmission rate values in an access point's beacon differs from the value it is supposed to be. (AirDefense Mobile auto-detected the rate property, or it was manually entered.) | |
| | Channel changed | Critical |
| | AirDefense Mobile detects whenever an access point changes channels. (The channel is identified in configuration information.) | |
| | Cf changed | |
| | AirDefense Mobile detects when the Point Coordination value in an AP's beacon changes. A change in this field may indicate that the access point was reconfigured, though this is not necessarily a problem. (The Point Coordination field refers to the access point's mode of collision avoidance.) | |
| | Essid changed | |
| | AirDefense Mobile detects when the access point's broadcast of its Extended BSS ID changes. The ESSID information is stored as configuration information. | |
| Unauthorized AP Admin | AirDefense Mobile detects when administration sessions are being conducted directly with the access point. | Critical |
| Odd Mgt. | Sta tx ap mgt fr | Critical |

Active Defense -continued

| Alarm Type | Alarm Subtype | Alarm Level |
| --- | --- | --- |
| Frame | AirDefense Mobile detects when a Station is transmitting a management frame reserved for access point's use. | |
| | Ap tx illegal mgt fr | Critical |
| | AirDefense Mobile detects when an access point transmits an illegal management frame. | |
| | Out of spec frame | Critical |
| | AirDefense Mobile detects when an access point transmits a frame that does not follow 802.11b standards. | |
| | Other bogus frame | Critical |
| | AirDefense Mobile detects when an access point transmits any frame it does not understand. | |
| Ad Hoc Net Detected | AirDefense Mobile detects when Stations are directly transmitting and receiving to and from each other without using an authorized access point. Note: Unlike all other alarms that are generated every time the network event is detected within a minute, AirDefense Mobile will only generate an Ad Hoc Network alarm once in the current 24 hour period for each MAC address. | Critical |
| AP Beacon Rate | AirDefense Mobile detects when an access point's beacon rate changed. | Critical |

In some embodiments of the present invention, one or more active defense mechanisms may be triggered in response to alarm in addition to, or instead of, the notification process described above. The system may provide active defense from attacks by broadcasting data into the wireless network as well as being able to trap and/or map an intruder's workstation by triangulating the position of the intruder's workstation relative to the wireless network access points.

By introducing CRC errors into the wireless stream, the system can actively defeat an attacker that is monitoring the stream for patterns to crack the encryption. CRC errors are introduced by transmitting at the same time as the detected intruder. Due the shared medium nature of the wireless computer network, the cause the packet transmission to be corrupted, preventing the intruder from successfully communicating with the network.

By introducing chaf, the system can actively defeat the attacker by placing random frames into the stream so that the encryption pattern becomes undetectable. Chaf is a form of randomized packet transmission that is designed to reduce the probability that a statistical analysis of the packet sequence would result in breaking of the encryption key. This is done by emitting a low-rate background transmission of packets that are emitted using the same characteristics (e.g., address, initialization vector, etc.) of legitimately observed traffic but with a randomized payload.

The system can lock-down a wireless network by jamming, a technique to prevent any unauthorized access to the wireless access point by introducing enough noise into the wireless network that workstations cannot physically connect to the wireless network. Jamming is a physical layer transmission that is performed to disrupt all unwanted wireless communications. It is equivalent to introducing a noise signal on top of the unwanted signal transmission such that any receiver would not be able to successfully receive the transmission.

In a Physical Device approachOne embodiment would utilize a standalone sensor to implement any of the Active Defense mechanisms. Dynamic channel change can be used to reroute authorized traffic to a different communication channel to avoid an intruder detected on a particular channel. In this approach, a channel change request is transmitted to the access point believed to be compromised and authorized stations use the new channel to communicate with the access point. This approach can also be used to avoid interference causing problems in communication between an access point and its authorized stations.

Figure 5:
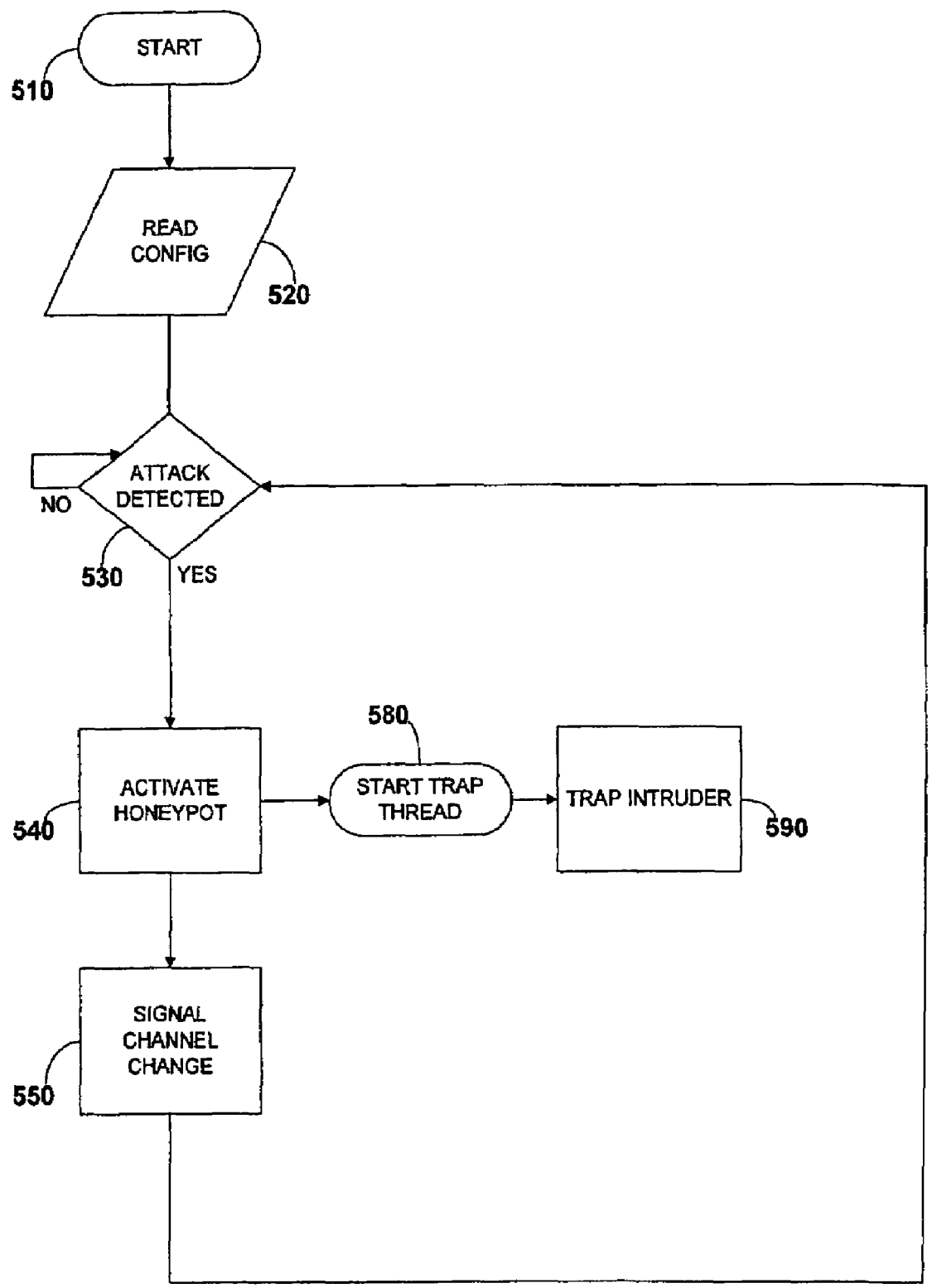
FIG. 5 is a flow chart of an exemplary dynamic channel change active defense process that includes a honeypot trap.

Some embodiments including dynamic channel change may further use a honeypot trap that tricks the attacker into thinking the original channel is still valid and provides the necessary forensic information to identify the attacker. FIG. 5 depicts a flow chart of a process starting at step 510 used in some such embodiment incorporating the honeypot trap.

In step 520, configuration information is received. This step is much the same as previously described steps 305 and 410 in FIGS. 3 and 4 respectively. Step 530 represents a waiting loop that waits until an attack has been detected. Typically, an intrusion detection system generates a signal that triggers departure from this loop; in some preferred embodiments, the intrusion detection system contains the hardware and/or executes the process described above. The signal from the intrusion detection system typically includes an indicator of the access point believed to be under attack.

In the case that an attack has been detected in 530, processing is passed to step 540 to activate the honeypot trap. A trap thread is started in step 580; the thread initializes itself with the identity of the monitored access point believed to be attacked. This identity typically includes the MAC address, Service Set Identifier, encryption mode, network mode and transmission modes. Once initialized, the thread moves to step 590, the Trap Intruder process. This process is designed to logically fool the identifier attacker into believing communication is still occurring with the original access point. This is accomplished through complete emulation of the original access point's identity and behavior. By maintaining communication with the attacker, a trap is created such that the attacker's physical proximity is assured as long as communication continues. Optionally, a new identity may be assumed such that a weaker or more vulnerable appearing access point can be presented to the attacker. This is done by again emulating access point functionality, but in this case with an identity and set of characteristics that appear vulnerable. This vulnerability appearance may be created through the use of no or weak encryption modes or the appearance of default manufacturing modes with known passwords and user IDs.

In step 550 a control packet is sent to the original access point to change channels or suspend transmission while the trap is engaged. This packet encapsulates a message indicating the above request and may be sent in or out-of-band to the access point. In-band refers to over-the-air transmission to the access point's wireless network interface whereas out-of-band transmission refers to transmission to the wired side interface of the access point.

Processing in the main loop then returns to attack detection in 530.

Triangulation determines the location of an attacker by mapping her relative position within the deployed wireless access points. The mapping and location detection process according to one or more preferred embodiments of the present invention as depicted in FIGS. 6A-B are discussed in greater detail below.

Figure 6A:
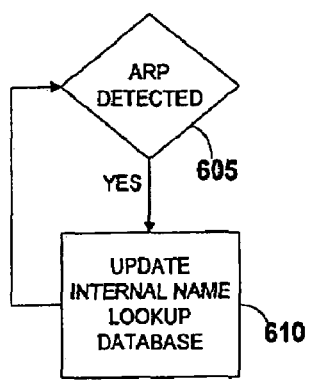
FIGS. 6A-B are flow charts of example station identification and location mapping processes.

The process of FIG. 6A is used to create an internal database of IP addresses and/or names mapped to corresponding MAC addresses. Every Address Resolution Protocol (ARP) transaction is detected in step 605. In step 610, the information in the detected transaction is used to update the internal database. Some embodiments can perform the identification and location processing such as depicted in FIG. 6B without reference to such an internal database. This database is created and maintained in one preferred embodiment to make the station identification and location process easier and more efficient.

Figure 6B:
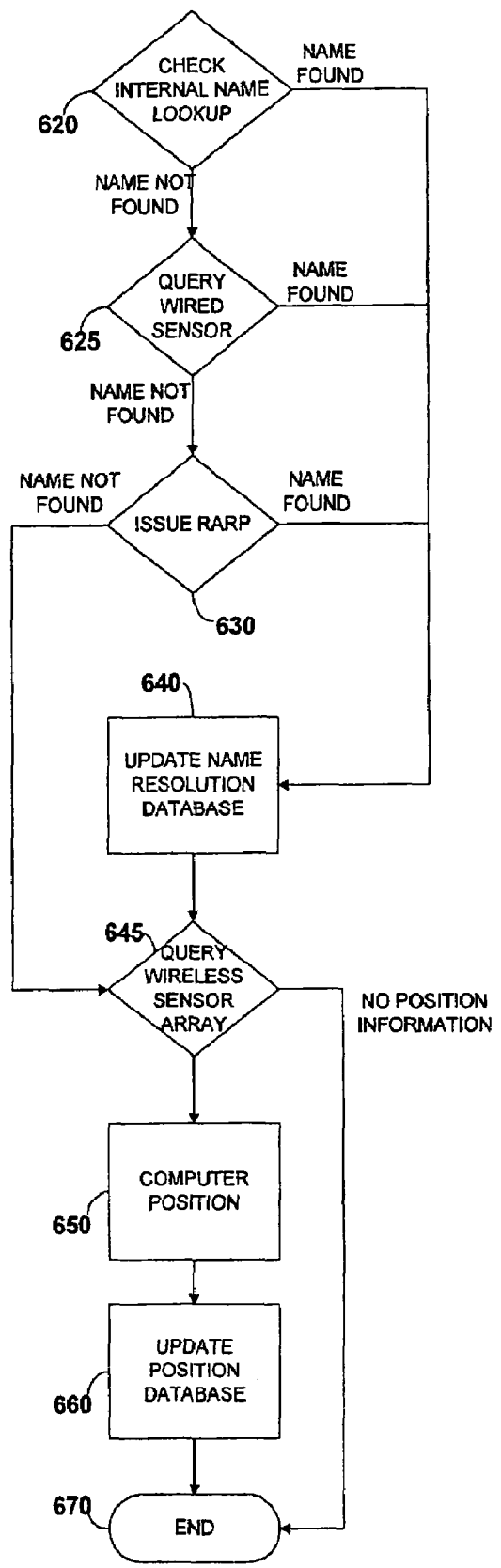

FIG. 6B depicts a process for identifying and locating a station within the wireless network. In some embodiments, this process can be used to pinpoint the location of a potential attacker; in some such embodiments, activation of the process is triggered by an intrusion detection system. In a preferred embodiment, the process is triggered by one of the intrusion detections systems and methods described in detail above.

In step 620, a lookup occurs in the internal database, such as created via the process depicted in FIG. 6A, on the current MAC address to determine if an IP or name mapping is already available. If found, the internal database is updated in step 640 and execution proceeds to step 645 to query the wireless sensor array, to begin position or location resolution. As indicated above, the internal database is one approach to acquiring the desired information. Some embodiments may skip this step and use either the wired network sensor or the reverse address resolution protocol (RARP) approach discussed below.

Otherwise, an optional wired network sensor can be queried for the name mapping in step 625. This sensor is preferably deployed within the wired network at a location convenient to sniffing DHCP, LDAP, DNS or other service/name mapping protocols. If found, the internal database is updated in step 640 and execution proceeds to step 645 to query the wireless sensor array, to begin position or location resolution. Some embodiments may not include such a wired network sensor; in which case this step is skipped.

If name is still not found, execution proceeds to step 630 where a RARP request is issued. This request asks the receiver population for the IP address of the MAC address in question. If found, the internal database is updated in step 640 and execution proceeds to step 645 to query the wireless sensor array, to begin position or location resolution.

If not found, name/IP mapping is not available at current time for this MAC address. In some embodiments, name/IP mapping may not be desired but location or position information is in which case the process can begin in such embodiments at step 645.

Step 645 begins the position or location resolution with a query to the wireless sensor array. Each sensor is queried for tracking information on the current MAC address in question. This tracking information identifies whether the MAC is currently observable by a given sensor, the sensor ID, and the signal strength associated with the MAC in question. The sensor array may include not only sensor devices (e.g., 230A, 230B) but also other wireless nodes accessible from this process such as devices 210A-D and/or host system 220.

From the data received via the query, the position relative to grid of sensors is calculated in step 650 by computing the "signal strength" distance to each sensor. This distance is computed as the square root of the sum of squares of three sensor signal strength values. The position is then estimated to be within the proximity of the sensors determined to have the smallest signal strength distance to the MAC address in question per the above computation. Once the set of sensors is selected, the position is further refined by selected the position as within the proximity of the sensor within above set with the strongest signal strength. In some embodiments, the process ends at this point with the position information being returned.

In embodiments maintaining a position database, this database is updated in step 660 with the position of the MAC address in question. The process then ends at step 670.

Encrypted Network Analysis and Management

The techniques utilized to monitor WLANs can apply in general to monitoring and analyzing any network link using encryption of the payload or at the IP layer and above rather than just WLANs. In this case, Layer 1 and Layer 2 are observed and decisions made at these layers in terms of signature, protocol, policy and statistical anomaly analysis to assess network health and security. This technique is thus applicable to any network (wired or wireless) exhibiting the above encryption characteristics of the network traffic. In other words, the multi-dimensional IDS implemented per our framework is more broadly applicable to managing and securing any encrypted network. In this case, a WLAN running WEP is one particular instance of an encrypted network.

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated by those skilled in the art that many deviations may be made from the specific embodiments disclosed in this specification without departing from the invention. Accordingly, the scope of the invention is to be determined by the claims below rather than being limited to the specifically described embodiments above.

What is claimed is:

1. A network security system, the system comprising:
a system data store configured to store risk criteria data, network default data, and network performance and usage data;
a first communication interface comprising a receiver that receives inbound communications from a communication channel associated with the communication interface;
a system processor comprising one or more processing elements, wherein the system processor is in communication with the system data store and wherein the system processor is programmed or adapted to perform the steps comprising:

receiving data corresponding to a frame transmitted over a wireless computer network and the signal used to transmit the frame via the communication interface;

detecting a violation by applying a plurality of intrusion detection tests that each compare the received data with data in the system data store or information derived therefrom;

generating an alarm signal upon detecting a violation.

2. The system of claim 1, wherein the system data store comprises a statistics data store that stores historical data regarding the wireless computer network.

3. The system of claim 2, wherein the system processor applies a statistical anomaly test during violation detection that compares the received data with network default data in the system data store, information derived therefrom, data in the statistics data store, information derived therefrom, or risk criteria data stored in the system data store.

4. The system of claim 2, wherein the system processor is further programmed or adapted to perform the step comprising updating the statistics data store based upon the received data.

5. The system of claim 1, wherein the first communication interface's receiver receives signals corresponding to a frame transmitted between stations and access points within the wireless computer network and forwards data corresponding to the frame to the system processor.

6. The system of claim 5, wherein the first communication interface's receiver is a wireless receiver.

7. The system of claim 5, wherein the signals received by the first communication interface's receiver originate from an access point within the wireless computer network, from a station within the wireless computer network, or from one or more sensors located within an area serviced by the wireless computer network.

8. The system of claim 7, further comprising one or more sensors located within an area serviced by the wireless network, wherein each of the one or more sensors comprise a wireless receiver capable of receiving frames transmitted over the wireless computer network and a transmitter capable of transmitting data associated with received frames over the communication channel to the first communication interface.

9. The system of claim 8, wherein each sensor further comprise at least one processing element of the system processor and wherein the at least one processing element is programmed or adapted to cause the sensor's transmitter to forward data associated with received frames in response to reception of received frames by the sensor's wireless receiver.

10. The system of claim 9, wherein each sensor's transmitter is a wireless transmitter or wherein each sensor further comprises a wireless transmitter, and wherein each sensor's at least one processor is further programmed or adapted to perform the step comprising triggering an active defense of the wireless computer network in response to a generated alarm.

11. The system of claim 5, wherein the first communication interface further comprises a transmitter that transmits outbound communications to the communication channel.

12. The system of claim 11, further comprising a device housing that houses the first communication interface and at least one processing element of the system processor, thereby forming a first device, and one or more additional devices, wherein each additional device comprises a housing, a device communication interface allowing communication via the communication channel and at least one processing element of the system processor, wherein the signals received by any of the first or the additional devices' respective communication interface originate from an access point within the wireless computer network, from a station within the wireless computer network, or from a different device.

13. The system of claim 12, further comprising one or more sensors located within an area serviced by the wireless network, wherein each of the one or more sensors comprise a wireless receiver capable of receiving frames transmitted over the wireless computer network and a transmitter capable of transmitting data associated with received frames over the communication channel to the first communication interface, wherein the signals received by any of the first or the additional devices' respective communication interface may also originate from one of the one or more sensors.

14. The system of claim 1, wherein the first communication interface further comprises a transmitter that transmits outbound communications to the communication channel and wherein the system processor is programmed or adapted to perform the steps comprising triggering an active defense of the wireless computer network in response to a generated alarm.

15. The system of claim 14, wherein each generated alarm comprises a type or a severity and wherein the system processor's triggering of an active defense comprises the step of selecting an active defense based upon the type or the severity of the generated alarm to which the triggering step was responsive.

16. The system of claim 1, wherein the system processor is further programmed or adapted to perform the steps comprising: receiving configuration information; and storing the received configuration information in the system data store.

17. The system of claim 16, wherein the configuration information is received by the system processor from a configuration file, from an interactive data entry interface or from a command line.

18. The system of claim 16, wherein the received configuration information comprises network default data and risk criteria.

19. The system of claim 1, wherein the system data store comprises a station data store and wherein the system processor is further programmed or adapted to perform the step comprising updating the station data store based upon the received data.

20. The system of claim 1, wherein the system data store comprises an access point data store and wherein the system processor is further programmed or adapted to perform the step comprising updating the access point data store based upon the received data.

21. The system of claim 1, wherein the system processor is further programmed or adapted to perform the step comprising notifying an administrator of the generated alarm if a violation was detected.

22. The system of claim 1, wherein the plurality of test applied by the system processor comprises two or more tests selected from the group consisting of signature test, protocol test, statistical anomaly test and policy test.

23. The system of claim 1, wherein the system processor is further programmed or adapted to perform the step comprising mapping a station's logical identity.

24. The system of claim 23, wherein the system processor is further programmed or adapted to perform the step comprising mapping station's physical location.

25. A method for detecting wireless intruders, the wireless intruders having the potential to compromise a wired network, the method comprising:

establishing risk criteria data, network default data and network performance and usage data based upon one or more of: a system administrator, a wireless network survey, or baseline wireless traffic levels;

receiving data corresponding to a frame transmitted over a wireless computer network and the signal used to transmit the frame via the communication interface;

detecting a policy violation by applying a plurality of intrusion detection tests, the intrusion detection tests being configured to compare the received data with one or more of the risk criteria data, the network default data, the network performance and usage data, or information derived therefrom; and generating an alarm signal upon detecting a violation, the alarm signal indicating that a potential intruder has been detected, the alarm signal being operable to alert an active defense system to defend the network against the potential intruder.

26. One or more computer readable media storing instructions configured to detect a wireless intruder, the instructions comprising:

policy establishment instructions configured to establish a policy based upon risk criteria data, network default data, and network performance and usage data, wherein the risk criteria data, network default data, and network performance and usage data being based upon one or more of: input from a system administrator, a wireless network survey, or baseline wireless traffic levels;

network interface logic configured to receive data corresponding to a frame transmitted over a wireless computer network and the signal used to transmit the frame via the communication interface;

policy violation detection instructions configured to detect a policy violation by applying a plurality of intrusion detection tests, the intrusion detection tests being configured to compare the received data with one or more of the risk criteria data, the network default data, the network performance and usage data, or information derived therefrom; and alarm instructions configured to generate an alarm signal responsive to the policy violation detection instructions, the alarm signal indicating that a potential intruder has been detected, the alarm signal being operable to alert an active defense system to defend the network against the potential intruder.

* * * * *

UNITED STATES PATENT AND TRADEMARK OFFICE
CERTIFICATE OF CORRECTION

PATENT NO. : 7,526,808 B2
APPLICATION NO. : 11/370611
DATED : April 28, 2009
INVENTOR(S) : Lynn et al.

It is certified that error appears in the above-identified patent and that said Letters Patent is hereby corrected as shown below:

ON THE TITLE PAGE

On the Title Page, in Item (57), under "ABSTRACT", in Column 2, Line 10, delete "on" and insert -- one --, therefor.

On the Title Page, in Item (57), under "ABSTRACT", in Column 2, Lines 13-14, delete "(typically" and insert -- typically --, therefor.

Title Page On Page 2, in Item (56), under "U.S. PATENT DOCUMENTS", in Column 1, Line 17, delete "Tamaka et al." and insert -- Tanaka et al. --, therefor.

Title Page On Page 3, in Item (56), under "OTHER PUBLICATIONS", in Column 2, Line 5, delete "Serverworld" and insert -- Serverworld: --, therefor.

Title Page On Page 3, in Item (56), under "OTHER PUBLICATIONS", in Column 2, Line 8, delete "Preswire" and insert -- Presswire --, therefor.

Title Page On Page 3, in Item (56), under "OTHER PUBLICATIONS", in Column 2, Line 16, delete "It" and insert -- IT --, therefor.

In Column 2, Line 12, delete "/dir1/dir2/resouce.htm" and insert -- /dir1/dir2/resource.htm --, therefor.

In Column 7, Line 34, delete "the a" and insert -- a --, therefor.

In Column 19, Line 57, delete "the a" and insert -- the --, therefor.

In Column 26, Line 46, delete "NEWTORK" and insert -- NETWORK --, therefor.

In Column 28, Line 44, delete "NEWTORK" and insert -- NETWORK --, therefor.

In Column 28, Line 46, delete "alarms" and insert -- alarms, --, therefor.

CERTIFICATE OF CORRECTION (continued)
U.S. Pat. No. 7,526,808 B2

In Column 33, Line 62, delete "approachOne" and insert -- approach, one --, therefor.

Signed and Sealed this

Sixteenth Day of February, 2010

David J. Kappos
*Director of the United States Patent and Trademark Office*